(12) United States Patent
Wu et al.

(10) Patent No.: US 11,934,539 B2
(45) Date of Patent: Mar. 19, 2024

(54) METHOD AND APPARATUS FOR STORING AND PROCESSING APPLICATION PROGRAM INFORMATION

(71) Applicant: Alibaba Group Holding Limited, Grand Cayman (KY)

(72) Inventors: Caidi Wu, Shanghai (CN); Dafu Lyu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 100 days.

(21) Appl. No.: 17/035,389

(22) Filed: Sep. 28, 2020

(65) Prior Publication Data

US 2021/0012017 A1 Jan. 14, 2021

Related U.S. Application Data

(63) Continuation of application No. PCT/CN2019/078420, filed on Mar. 18, 2019.

(30) Foreign Application Priority Data

Mar. 29, 2018 (CN) .......................... 201810274315.3

(51) Int. Cl.
*G06F 21/60* (2013.01)
*G06F 21/12* (2013.01)
(Continued)

(52) U.S. Cl.
CPC .......... *G06F 21/602* (2013.01); *G06F 21/125* (2013.01); *G06F 21/14* (2013.01); *G06F 21/6209* (2013.01)

(58) Field of Classification Search
CPC ...... G06F 21/602; G06F 21/125; G06F 21/14; G06F 21/6209
See application file for complete search history.

(56) References Cited

U.S. PATENT DOCUMENTS

| 8,468,244 B2 | 6/2013 | Redlich et al. |
| 8,539,536 B2 | 9/2013 | Ganesan et al. |

(Continued)

FOREIGN PATENT DOCUMENTS

| CN | 101470789 A | 7/2009 |
| CN | 103902922 A | 7/2014 |

(Continued)

OTHER PUBLICATIONS

Translation of International Search Report for corresponding PCT Application No. PCT/CN2019/078420 dated Jun. 20, 2019, a counterpart foreign application for U.S. Appl. No. 17/035,389, 2 pages.

(Continued)

*Primary Examiner* — Jung W Kim
*Assistant Examiner* — Alan L Kong
(74) *Attorney, Agent, or Firm* — Lee & Hayes P.C.

(57) ABSTRACT

A method for storing application program information including segmenting the application program information into program sub-information, with an information segmentation algorithm of the application program information having undergone algorithm obfuscation processing; and storing the program sub-information. The present disclosure significantly reduces the possibility of application program information being acquired by hackers and the like, and improves the security of application program information and electronic devices.

15 Claims, 9 Drawing Sheets

---

SEGMENT APPLICATION PROGRAM INFORMATION INTO PROGRAM SUB-INFORMATION, WITH INFORMATION SEGMENTATION ALGORITHM OF APPLICATION PROGRAM INFORMATION HAVING UNDERGONE ALGORITHM OBFUSCATION PROCESSING
102

STORE PROGRAM SUB-INFORMATION
104

(51) Int. Cl.
*G06F 21/14* (2013.01)
*G06F 21/62* (2013.01)

(56) References Cited

U.S. PATENT DOCUMENTS

| | | | |
|---|---|---|---|
| 8,683,231 B2 | 3/2014 | Grube et al. | |
| 9,292,700 B2 | 3/2016 | Parker et al. | |
| 9,436,842 B2 | 9/2016 | Purohit | |
| 9,825,932 B2 | 11/2017 | Ponsford et al. | |
| 10,447,662 B2 | 10/2019 | Resch | |
| 2005/0216754 A1* | 9/2005 | Ehud | G06F 21/6209 713/193 |
| 2006/0182282 A1* | 8/2006 | Negahdar | H04L 63/045 380/277 |
| 2007/0143616 A1* | 6/2007 | Everett | G06F 21/77 713/172 |
| 2007/0283011 A1* | 12/2007 | Rakowski | H04L 41/0803 709/225 |
| 2008/0147831 A1* | 6/2008 | Redjaian | H04W 4/02 709/222 |
| 2008/0201336 A1 | 8/2008 | Yamato | |
| 2009/0177894 A1* | 7/2009 | Orsini | H04L 63/062 713/193 |
| 2012/0102316 A1 | 4/2012 | Resch et al. | |
| 2014/0136832 A1* | 5/2014 | Klum | G06F 11/1451 713/150 |
| 2014/0250534 A1* | 9/2014 | Flores | G06F 21/6209 726/26 |
| 2014/0281550 A1* | 9/2014 | Resch | H04L 9/0863 713/171 |
| 2015/0127950 A1 | 5/2015 | Irvine | |
| 2016/0239674 A1* | 8/2016 | Bao | H04W 12/04 |
| 2016/0342608 A1* | 11/2016 | Burshteyn | H04L 63/0428 |
| 2017/0372067 A1* | 12/2017 | Kim | G09C 1/00 |
| 2019/0102260 A1* | 4/2019 | Yang | G06F 9/485 |

FOREIGN PATENT DOCUMENTS

| | | |
|---|---|---|
| CN | 103955528 A | 7/2014 |
| CN | 104102860 A | 10/2014 |
| CN | 105187303 A | 12/2015 |
| CN | 106326693 A | 1/2017 |
| CN | 107209815 A | 9/2017 |
| CN | 107453866 A | 12/2017 |
| EP | 2264635 | 12/2010 |

OTHER PUBLICATIONS

Translation of Written Opinion for corresponding PCT Application No. PCT/CN2019/078420 dated Jun. 20, 2019, a counterpart foreign application for U.S. Appl. No. 17/035,389, 4 pages.
Translation of CN First Office Action for corresponding CN Application No. 201810274315.3 dated Jan. 12, 2022, a counterpart foreign application for U.S. Appl. No. 17/035,389, 5 pages.
Translation of CN First Search Report for corresponding CN Application No. 201810274315.3 dated Jan. 5, 2022, a counterpart foreign application for U.S. Appl. No. 17/035,389, 1 page.
Translation of CN Second Office Action for corresponding CN Application No. 201810274315.3 dated May 5, 2022, a counterpart foreign application for U.S. Appl. No. 17/035,389, 10 pages.

* cited by examiner

Segment application program information into program sub-information, with information segmentation algorithm of application program information having undergone algorithm obfuscation processing
102

Store program sub-information
104

METHOD AND APPARATUS FOR STORING AND PROCESSING APPLICATION PROGRAM INFORMATION

CROSS REFERENCE TO RELATED APPLICATIONS

This application claims priority to and is a continuation of PCT Patent Application No. PCT/CN2019/078420, filed on 18 Mar. 2019 and entitled "APPLICATION PROGRAM INFORMATION STORING METHOD AND APPARATUS, AND APPLICATION PROGRAM INFORMATION PROCESSING METHOD AND APPARATUS," which claims priority to Chinese Patent Application No. 201810274315.3, filed on 29 Mar. 2018 and entitled "APPLICATION PROGRAM INFORMATION STORING METHOD AND APPARATUS, AND APPLICATION PROGRAM INFORMATION PROCESSING METHOD AND APPARATUS," which are incorporated herein by reference in their entirety.

TECHNICAL FIELD

The present disclosure relates to the field of computer technology, and, more particularly, to methods and apparatuses for storing and processing application program information.

BACKGROUND

With the development of the Internet of Things and computer technologies, a large number of electronic devices with insufficient hardware security capabilities and limited resources, such as various electronic devices serving as terminal nodes of the Internet of Things, have been put into use. These electronic devices are usually inexpensive, have no security protection or difficulties in setting up security protection, and also lack hardware security capabilities. As a result, application program information on these electronic devices is easily obtained by hackers and the like, leading to security risks.

In conventional technologies, the application program information of each application program on an electronic device is saved in the configuration file of the application program. When the application program needs to use the application program information, it acquires the application program information directly from the configuration file of the application program. However, in such cases, the application program information is directly exposed in the memory, hence the relevant information in the configuration file could be easily learned through dynamic analysis once the electronic device is acquired by a hacker or the like. Thus, the application program information of any application program in the electronic device is leaked.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the above-described problems, the present disclosure provides methods and apparatuses for storing and processing application program information which overcome the above-described problems.

The present disclosure provides a method for storing application program information, the method comprising:

segmenting the application program information into program sub-information, with an information segmentation algorithm of the application program information having undergone algorithm obfuscation processing; and storing the program sub-information.

For example, the step of segmenting the application program information into program sub-information comprises:

randomly dispersing the application program information to obtain multiple pieces of program sub-information.

For example, the step of storing the program sub-information comprises:

storing the multiple pieces of program sub-information to a plurality of storage locations in an information management space.

For example, the step of storing the program sub-information comprises:

storing the program sub-information using an information storage algorithm, wherein the information storage algorithm has undergone algorithm obfuscation processing.

For example, the method further comprises:

performing algorithm obfuscation processing on the information segmentation algorithm.

For example, the algorithm obfuscation processing comprises at least one of the following: function renaming, character string encryption, instruction substitution, control flow flattening, fake branch transformation, garbage insertion, and order disruption.

For example, the method further comprises:

generating the application program information according to raw application program information and a first auxiliary key.

For example, the step of generating the application program information according to raw application program information and a first auxiliary key comprises:

encrypting the raw application program information by using the first auxiliary key to obtain the application program information.

For example, the method further comprises:
randomly generating the first auxiliary key.

For example, the method further comprises:
generating a second auxiliary key according to a unique device identifier, and encrypting the first auxiliary key by using the second auxiliary key.

For example, the method further comprises the following after the step of encrypting the first auxiliary key by using the second auxiliary key:

saving an encryption result of encrypting the first auxiliary key by using the second auxiliary key.

For example, the method further comprises:

generating check information for an integrity check according to at least one of the following: the raw application program information and/or the application program information, and adding the check information to the application program information, so as to determine integrity of the raw application program information and/or the application program information according to the check information.

For example, the method further comprises:

adding attribute information of the raw application program information to the application program information, so as to determine integrity of the raw application program information according to the attribute information.

For example, the application program information includes an application program key.

The present disclosure further provides a method for processing application program information, the method comprising:

performing deobfuscation on an information segmentation algorithm having undergone algorithm obfuscation processing;

extracting program sub-information; and recombining the program sub-information according to the information segmentation algorithm having undergone deobfuscation to obtain application program information.

For example, the step of performing deobfuscation on an information segmentation algorithm having undergone algorithm obfuscation processing comprises:

performing corresponding deobfuscation processing on the information segmentation algorithm according to the algorithm obfuscation processing.

For example, the step of extracting program sub-information comprises:

extracting the program sub-information according to a deobfuscated information storage algorithm.

For example, the application program information is generated according to raw application program information and a first auxiliary key, and the method further comprises:

acquiring the first auxiliary key; and generating the raw application program information according to the application program information and the first auxiliary key.

For example, the step of generating the raw application program information according to the application program information and the first auxiliary key comprises:

using the first auxiliary key to decrypt the application program information to obtain the raw application program information.

For example, the method further comprises:

generating a second auxiliary key; and using the second auxiliary key to decrypt an encryption result of the first auxiliary key to obtain the first auxiliary key.

For example, the step of generating a second auxiliary key comprises:

generating the second auxiliary key according to a unique device identifier.

For example, the application program information includes check information for an integrity check and/or attribute information of the raw application program information, and the check information is generated according to at least one of the following: the raw application program information and/or the application program information; and the method further comprises:

performing an integrity check on the application program information according to the check information or the attribute information, and determining that the integrity check passes.

For example, the method further comprises:

providing an information use interface, and receiving to-be-processed data through the information use interface; and processing the to-be-processed data using the application program information, and outputting a processing result.

The present disclosure further provides an apparatus for storing application program information, the apparatus comprising:

an application program segmentation module, configured to segment application program information into program sub-information, with an information segmentation algorithm of the application program information having undergone algorithm obfuscation processing; and a program sub-information storage module, configured to store the program sub-information.

For example, the application program segmentation module comprises:

an application program information processing sub-module, configured to randomly disperse the application program information to obtain multiple pieces of program sub-information.

For example, the program sub-information storage module comprises:

a first program sub-information storage sub-module, configured to store the multiple pieces of program sub-information to a plurality of storage locations in an information management space.

For example, the apparatus further comprises:

an application program information generation module, configured to generate the application program information according to raw application program information and a first auxiliary key.

For example, the apparatus further comprises:

a first auxiliary key encryption module, configured to generate a second auxiliary key according to a unique device identifier and encrypt the first auxiliary key by using the second auxiliary key.

The present disclosure further provides an apparatus for processing application program information, comprising:

a deobfuscation module, configured to perform deobfuscation on an information segmentation algorithm having undergone algorithm obfuscation processing;

a program sub-information extraction module, configured to extract program sub-information; and a program sub-information recombination module, configured to recombine the program sub-information according to the information segmentation algorithm having undergone deobfuscation to obtain application program information.

For example, the application program information is generated according to the raw application program information and a first auxiliary key, and the apparatus further comprises:

a first auxiliary key acquisition module, configured to acquire the first auxiliary key; and a raw application program information generation module, configured to generate the raw application program information according to the application program information and the first auxiliary key.

For example, the apparatus further comprises:

a second auxiliary key generation module, configured to generate a second auxiliary key; and a first auxiliary key decrypting module, configured to use the second auxiliary key to decrypt an encryption result of the first auxiliary key to obtain the first auxiliary key.

For example, the apparatus further comprises:

an information use interface module, configured to provide an information use interface and receive to-be-processed data through the information use interface; and a processing result output module, configured to process the to-be-processed data using the application program information and output a processing result.

The present disclosure further provides a computer device, comprising a memory, a processor, and a computer program stored on the memory and executable by the processor, and one or more of the foregoing methods are implemented by the processor executing the computer program.

The present disclosure further provides a computer-readable storage medium storing a computer program, and executing the computer program by the processor to implement one or more of the foregoing methods.

In the embodiments of the present disclosure, an information segmentation algorithm having undergone algorithm obfuscation processing is used to segment application program information, and program sub-information obtained from the segmentation is stored. On the one hand, the present disclosure avoids directly exposing the application program information in a storage space such as a memory; on the other hand, the information segmentation algorithm having undergone algorithm obfuscation processing also makes it difficult for hackers to acquire and determine the manner of segmenting the application program information. In this way, even if the electronic device is obtained by a hacker, it would be difficult for the hacker to obtain the application program information according to the program sub-information. Therefore, the possibility of a hacker acquiring the application program information is greatly reduced, and the security of electronic devices is improved.

The above description is only an overview of the technical solutions of the present disclosure. In order to understand the technical solutions of the present disclosure more clearly for implementing them in accordance with the content of the specification, and to make the above-described and other objectives, features and advantages of the present disclosure more apparent and understandable, the detailed implementation manners of the present disclosure are illustrated below.

BRIEF DESCRIPTION OF DRAWINGS

In order to more clearly explain the technical solutions of the example embodiments of the present disclosure, the drawings for the example embodiments of the present disclosure will be briefly described. The drawings are only provided for the purpose of showing the example implementations, and are not considered as limitations to the present disclosure. The same reference numerals refer to the same elements throughout the drawings. In the drawings.

DESCRIPTION OF EMBODIMENTS

Figure 1:
FIG. 1 shows a flowchart of a method for storing application program information according to an embodiment of the present disclosure.

Exemplary embodiments of the present disclosure will be described in more detail with reference to the accompanying drawings as follows. Although the drawings show exemplary embodiments of the present disclosure, it should be understood that the present disclosure may be embodied in many different forms and should not be construed as limited to the embodiments set forth herein. Rather, these embodiments are provided to enable a more thorough understanding of the present disclosure and to fully convey the scope of the present disclosure to those skilled in the art.

In order to enable those skilled in the art to understand the embodiments of the present disclosure in depth, the definitions of technical terms involved in the embodiments of the present disclosure will be introduced first.

Application program information is information of an application program in an electronic device, and may include sensitive information which requires relatively high security, such as application program keys or user passwords. In practical applications, it may also include other information related to the application program(s).

Program sub-information is a result of segmenting an application program. For example, if the application program information is a character sequence, the program sub-information may be a sub-sequence in the character sequence; and if the application program is a matrix or other information arranged as a structure, the program sub-information may be a sub-matrix of the matrix or sub-information of the corresponding structure.

An information segmentation algorithm is an algorithm for segmenting application program information. The algorithm may segment input application program information and output program sub-information. Apparently, in practical applications, the algorithm may also search input data (such as text information, computer program codes, or data arranged as other structures) for application program information, and then segment the application program to output program sub-information.

Algorithm obfuscation, also called code obfuscation, is an action of transforming a computer program code into a form difficult to read or understand. Code obfuscation may be used for source codes of a program or intermediate codes generated by program compilation. For example, names of various elements in a code, such as variables, functions and classes, may be modified to meaningless names, making it difficult for readers to guess the true function and use of the code according to the names. Apparently, in practical applications, the algorithm obfuscation may also obfuscate the algorithm provided by the embodiments of the present invention in other manners, and details are omitted here to avoid redundancy.

An electronic device may be all kinds of IoT terminals or devices, such as various detectors used in weather or environment monitoring, or smart home devices such as smart speakers at home, and may also include mobile phones, smart watches, VR (Virtual Reality) devices, tablets, e-book readers, MP3 (Moving Picture Experts Group Audio Layer III) players, MP4 (Moving Picture Experts Group Audio Layer IV) players, laptop portable computers, on-board computers, desktop computers, set-top boxes, wearable devices, etc. The electronic device may interact with a remote server to acquire a client, plug-in, or a storage or processing service for application program information, and may include any of the devices in FIGS. 7-9 below to implement any of the methods in FIGS. 1-6, thereby storing or processing the application program information.

The client may include at least one application program. The client may run in a positioning device, so as to implement the method for storing or processing application program information provided by the embodiments of the present disclosure.

The plug-in may be included in the application program running on the positioning device, so as to implement the method for storing or processing application program information provided by the embodiments of the present disclosure.

The embodiments of the present disclosure may be applied to scenarios where application program information is stored or processed. Because directly storing application program information of an application program in a configuration file of the application program results in the application program information being directly exposed in a memory of an electronic device, the application program information would be easily obtained directly from the configuration file if the electronic device is obtained by a hacker, leading to poor security of the electronic device. Therefore, in order to avoid the application program information being directly exposed in the memory and to increase the difficulty in acquiring the application program information and to in turn improve the security of the electronic device, the embodiments of the present disclosure provide a method for storing application program information, which segments application program information using an information segmentation algorithm having undergone algorithm obfuscation processing, and stores program sub-information obtained through segmentation. After the application program information is stored by using the method for storing application program information provided by the present disclosure, even if the electronic device is acquired by a hacker, the hacker would have significant difficulties in directly acquiring the stored application program information, and because the information segmentation algorithm has undergone algorithm obfuscation processing, it is also difficult for the hacker to recognize how the application program information is segmented, acquire all the program sub-information, and acquire the application program information according to the obtained program sub-information. In this way, the possibility of the application program information being acquired by hackers and the like is greatly reduced, and the security of the application program information and the electronic device is improved.

The embodiments of the present disclosure may be implemented as a client or a plug-in, and an electronic device may acquire and install the client or the plug-in from a remote server, so that the client or the plug-in implements the method for storing or processing application program information provided by the embodiments of the present disclosure. Apparently, the embodiments of the present disclosure may also be deployed on a remote server in the form of software, and an electronic device may access the remote server to acquire an application program information storage or processing service.

Referring to FIG. 1, a flowchart of a method for storing application program information according to an embodiment of the present disclosure is shown. The method specifically comprises steps as follows:

step 102, segmenting the application program information into program sub-information, with an information segmentation algorithm of the application program information having undergone algorithm obfuscation processing.

In order to avoid the problem of insufficient security caused by directly exposing the application program information in a memory of an electronic device, the information segmentation algorithm having undergone algorithm obfuscation processing may be used to segment the application program information into program sub-information, so that even if a hacker or the like acquires the electronic device, it would be difficult to acquire the application program information directly from the memory, and even if the program sub-information is acquired, it would be difficult to determine how the application program information is segmented because the information segmentation algorithm has undergone algorithm obfuscation processing. Therefore, it is difficult to obtain the application program information according to the program sub-information, thus greatly reducing the possibility of the application program information being acquired by hackers and the like (through dynamic analysis or static analysis), and improving the security of the application program information and the electronic device.

At least one of the following may be pre-determined: the number of segmentation pieces of program sub-information and the segmentation position(s), such as receiving at least one of the following: a submitted number of pieces of program sub-information and submitted segmentation position(s), so as to segment the application program information according to the at least one of the following: the determined number of pieces of program sub-information and the determined segmentation position(s); alternatively, the manner of determining, according to the application program information, at least one of the following: the number of pieces of program sub-information and the segmentation position(s) may be pre-determined, such as by setting that the number of segmentation pieces of program sub-information is determined according to the data volume or security level of the application program information, and/or by setting a data feature of an application program information word at the segmentation position(s), etc. In this way, detection of the application program information is performed by using the information segmentation algorithm to obtain at least one of the following: the number of pieces of program sub-information and the segmentation position(s), and the application program information is segmented according to the at least one of the following: the obtained number of pieces of program sub-information and the segmentation position(s).

The security level of the application program information is used to express the importance of the security of the application program information. The security level may be pre-determined by the electronic device, such as determination by receiving user submission or determination according to an associated application program. Apparently, in practical applications, it may also be determined by other means, which are omitted here to avoid redundancy.

The manner of algorithm obfuscation processing to be performed on the information segmentation algorithm may be pre-determined, such as receiving a submitted manner of algorithm obfuscation processing, and algorithm obfuscation is then performed on the information segmentation algorithm according to the determined manner of algorithm obfuscation processing.

Step 104: storing the program sub-information.

In order to enable the application program in the electronic device to acquire the application program information, or perform other operations based on the application program information or the program sub-information, the program sub-information obtained by segmenting the application program information may be stored.

Multiple pieces of program sub-information obtained by the segmentation may be stored in more than one storage location separately, or the order of the multiple pieces of program sub-information may be disrupted and stored in the same storage location. Furthermore, the more dispersed the storage locations of the multiple pieces of program sub-information are and the more scattered the order thereof, the higher possibility to prevent a hacker from acquiring the program sub-information as a whole or further obtaining the application program information, thereby improving the security of the electronic device.

In the embodiments of the present disclosure, an information segmentation algorithm having undergone algorithm obfuscation processing may be used to segment application program information, and program sub-information obtained from the segmentation is stored. On the one hand, it avoids directly exposing the application program information in a storage space such as a memory; on the other hand, the information segmentation algorithm having undergone algorithm obfuscation processing also makes it difficult for hackers and the like to acquire and determine how the application program information is segmented. In this way, even if the electronic device is obtained by a hacker, it would be difficult to obtain the application program information according to the program sub-information. Therefore, the possibility of hackers and the like acquiring the application program information is greatly reduced, and the security of electronic devices is improved.

Figure 2:
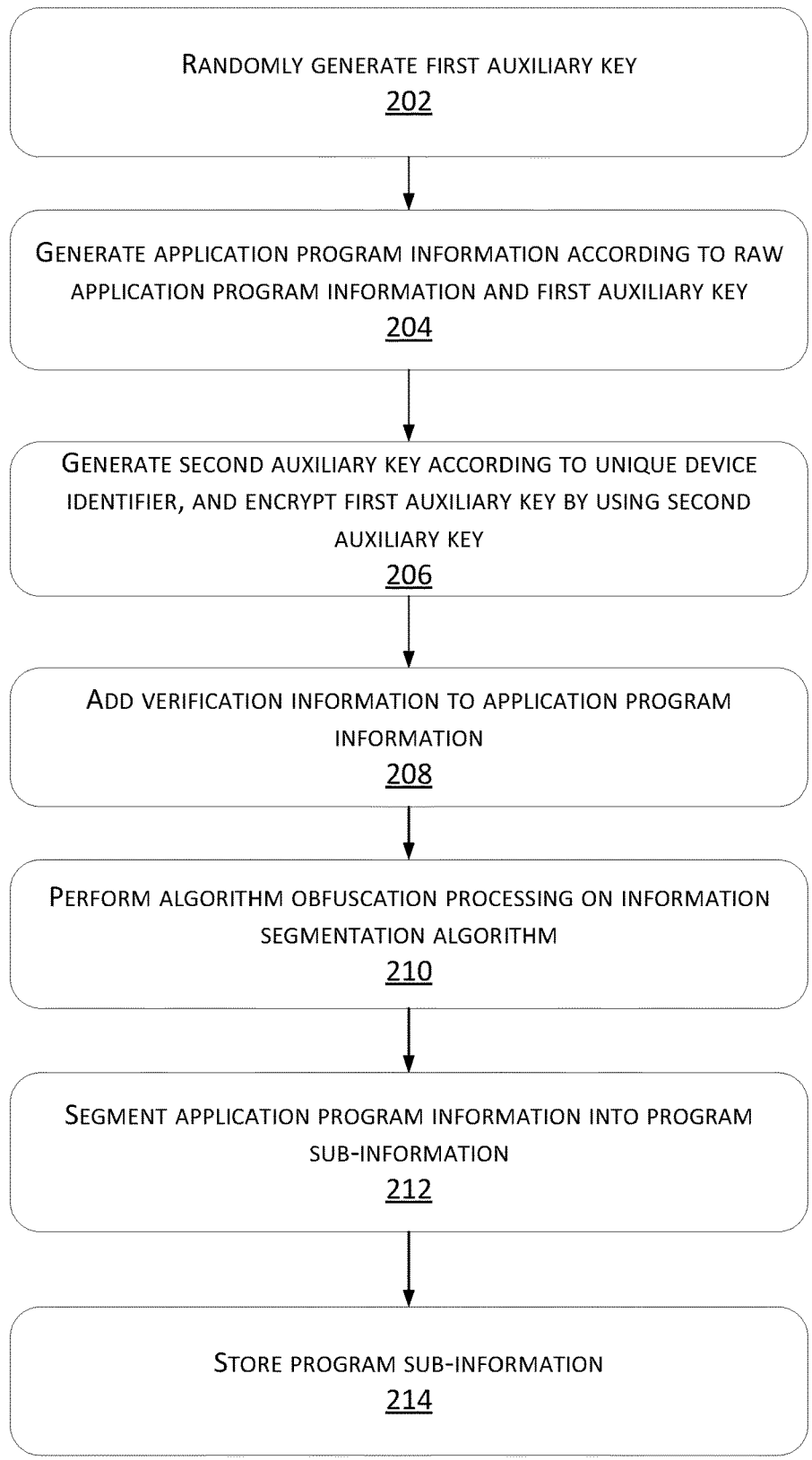
FIG. 2 shows a flowchart of a method for storing application program information according to an embodiment of the present disclosure.

Referring to FIG. 2, a flowchart of a method for storing application program information according to an embodiment of the present disclosure is shown. The method specifically comprises steps as follows:

step 202, randomly generating a first auxiliary key.

In order to enable subsequent hierarchical key management based on the first auxiliary key, to increase the difficulty for hackers and the like to crack and obtain the application program information, and to further improve the security of the application program information and the electronic device, a first auxiliary key may be generated. In addition, in order to ensure more secure protection across application program information of different application programs, to further increase the difficulty for hackers and the like to crack and obtain the application program information, and to improve the security of the application program information and the electronic device, the first auxiliary key may be randomly generated.

The hierarchical key management refers to generating a plurality of keys in different manners and storing and managing each of the keys separately. Information is encrypted by all or some of the keys, and the keys used to encrypt the information are further encrypted by some of the remaining keys thereof to effectively increase the complexity of encryption, making it difficult for hackers and the like to obtain all of the keys, and accordingly difficult to crack the encrypted information, so as to improve the security of the encrypted information.

The first auxiliary key may be randomly generated through a key generation algorithm.

The first auxiliary key may be stored in the application program information, or may be stored at another storage location in the electronic device.

In the embodiments of the present disclosure, for example, since an application program key is information having a high security requirement, the application program information includes the application program key, so as to improve the security of the application program and the electronic device.

In addition, in another example embodiment of the present disclosure, step 202 is an example step.

Step 204: generating the application program information according to raw application program information and the first auxiliary key.

In order to achieve the hierarchical key management based on the first auxiliary key, to further increase the difficulty for hackers and the like to crack and obtain the application program information, and to improve the security of the application program information and the electronic device, the application program information may be generated according to raw application program information and the above-described first auxiliary key.

It may be seen from the foregoing that the application program information is information of an application program in the electronic device, including an application program key. Therefore, in order to achieve the hierarchical key management, the information of the application program in the electronic device may be used as the raw application program information, and a result generated according to the raw application program information and the first auxiliary key is used as the application program information. That is, if no auxiliary key is used to achieve the hierarchical key management, the information of the application program in the electronic device may be directly used as the application program information; and if an auxiliary key is used to achieve the hierarchical key management, the result generated from the information of the application program in the electronic device and the auxiliary key may be used as the application program information.

In the embodiment of the present disclosure, for example, in order to achieve the hierarchical key management based on the first auxiliary key, to further increase the difficulty for hackers and the like to crack and obtain the application program information, and to improve the security of the application program information and the electronic device, the first auxiliary key may be used to encrypt the raw application program information to obtain the application program information.

Apparently, in practical applications, the application program information may also be generated in other manners according to the raw application program information and the first auxiliary key, for example, directly adding the first auxiliary key to the raw application program information.

In addition, in another example embodiment of the present disclosure, step 202 is an example step: if step 202 is not performed, execution of step 204 may be omitted.

Step 206: generating a second auxiliary key according to a unique device identifier, and encrypting the first auxiliary key by using the second auxiliary key.

In order to enable the subsequent hierarchical key management based on the first auxiliary key, to further increase the difficulty for hackers and the like to crack and obtain the application program information, and to improve the security of the application program information and the electronic device, a second auxiliary key may be generated and used to encrypt the first auxiliary key. In addition, in order to ensure that one electronic device corresponds to one second auxiliary key, to avoid the problem of cracking one electronic device leading to acquisition of application program information in other electronic devices of the same type, and to further improve the security of application programs and electronic devices, the second auxiliary key may be generated according to a unique device identifier.

The unique device identifier is used to uniquely identify one electronic device. For example, the unique device identifier may include an IMEI (International Mobile Equipment Identity) or MAC (Media Access Control) address.

In the embodiment of the present disclosure, for example, in order to ensure that the application program information may be acquired through decryption later, that is, to ensure that a legitimate user of the application program information may normally acquire the application program information, the encryption result of encrypting the first auxiliary key by using the second auxiliary key may be saved.

The encryption result from encrypting the first auxiliary key by using the second auxiliary key is the first auxiliary key encrypted by the second auxiliary key.

Here, the encryption result may be stored in the application program information, or the encryption result and the application program information may be stored correspondingly in other storage locations in the electronic device.

Apparently, in practical applications, in order to achieve hierarchical key management, to further increase the difficulty for a hacker to crack and obtain application program information, and to improve the security of application program information and electronic devices, more auxiliary keys may be generated to achieve multi-level encryption of the first auxiliary key, or in order to improve the efficiency of storing application programs or reduce the difficulty in implementing the embodiment of the present disclosure, generation of the second auxiliary key may be omitted, that is, step 206 is an example step.

In addition, in another example embodiment of the present disclosure, the first auxiliary key and the second auxiliary key may be generated in the same manner as the foregoing or conversely. For example, both the first auxiliary key and the second auxiliary key may be generated in a random manner or according to the unique device identifier; or, the first auxiliary key is generated according to the unique device identifier, and the second auxiliary key is generated in a random manner.

Step 208: adding verification information to the application program information.

In order to enable subsequent verification of the application program information restored according to the program sub-information and to further improve the security and reliability of the application program information, verification information may be added to the application program information.

The verification information is information for verifying the application program information. The verification information may include check information such as a hash value of the application program information, and/or one or more pieces of attribute information such as the length and type of the application program information. Apparently, in practical applications, the check information or the attribute information may also include other information that enables verification of the application program information.

The hash value is a binary value obtained by computation according to file data (such as application program information), and is used to verify integrity of the file data.

The type of application program information is used to describe the category to which the application program information belongs. For example, taking the application program information being an application program key for example, the type of the application program key may be used to describe the encryption manner of the application program key, including AES (Advanced Encryption Standard) or RSA (the name of an encryption algorithm).

In the embodiment of the present disclosure, for example, in order to enable subsequent verification of the application program information restored according to the program sub-information and to further improve the security and reliability of the application program information, the check information used for the integrity check may be generated according to at least one of the following: the raw application program information program and/or the application program information, and the check information may be added to the application program information to determine integrity of the raw application program information and/or the application program information according to the check information.

For example, if the raw application program information is an application program key, the check information may be generated according to the application program key, and/or the check information may be generated according to a result generated from the application program key and the auxiliary key.

Apparently, if step 204 is not performed previously, the check information may be generated according to the application program information.

In the embodiment of the present disclosure, for example, in order to enable subsequent verification of the application program information restored according to the program sub-information, and to further improve the security and reliability of the application program information, the attribute information of the raw application program information may be added to the application program information to determine integrity of the raw application program information according to the attribute information.

The attribute information may be obtained by receiving attribute information submitted by a user regarding the raw application program information, or by performing detection on the raw application program information. Apparently, in practical applications, the attribute information of the raw application program information may also be determined by other means.

Apparently, if step 204 is not performed previously, the attribute information of the application program information may be determined and added to the application program information in the same manner.

Step 210: performing algorithm obfuscation processing on the information segmentation algorithm.

In order to make the information segmentation algorithm difficult to read and understand, to reduce the possibility of a hacker acquiring the manner of segmenting the application program information when an electronic device is acquired, and to increase the difficulty in acquiring the program sub-information and the application program information, that is, to improve the security of the program sub-information and application program information, algorithm obfuscation processing may be performed on the information segmentation algorithm.

Here, for the manner of performing obfuscation processing on the information segmentation algorithm, reference may be made to the related description in the foregoing, and the details will be omitted here to avoid redundancy.

In the embodiment of the present disclosure, for example, in order to enhance the effect of obfuscating the information segmentation algorithm, to further reduce the possibility of a hacker recognizing how the application program information is segmented, and to improve the security of the program sub-information and the application program information, the algorithm obfuscation processing may include at least one of the following: function renaming, character string encryption, instruction substitution, control flow flattening, fake branch transformation, garbage insertion, and order disruption. Correspondingly, the information segmentation algorithm may undergo at least one type of the following algorithm obfuscation processing: function renaming, character string encryption, instruction substitution, control flow flattening, fake branch transformation, garbage insertion, and order disruption.

Function renaming refers to replacing the name of each element, such as function names, variable names, and class names, included in a computer code with any other meaningless name or a name irrelevant to actual functions of the element.

Instruction substitution refers to substituting instructions included in a computer code, such as changing a for loop to a while loop and a loop to recursion.

Control flow flattening refers to converting if, while, for, do and other control statements in a computer code into switch branch statements without changing functions of the source code, thereby obscuring the relationship between case code blocks in a switch and increasing the difficulty in analysis.

Fake branch transformation refers to changing the content of branch statements in a code.

Garbage insertion refers to inserting a set of useless bytes in a computer code, which will not change functions of the source computer code, but cause errors when disassembling the computer code, thereby causing a disassembly tool to fail and increasing the cracking difficulty.

Order disruption refers to changing the execution order of branch statements in a code.

In addition, in another example embodiment of the application, step 210 and steps 202-208 may be performed independently, without any limitation on the execution order.

Step 212: segmenting the application program information into program sub-information.

Here, for the manner of segmenting the application program information into program sub-information by using the information segmentation algorithm having undergone algorithm obfuscation processing, reference may be made to the related description in the foregoing, and the details will be omitted here to avoid redundancy.

In the embodiment of the present disclosure, for example, in order to increase the complexity of segmenting application program information, to in turn increase the difficulty for hackers and the like to acquire the program sub-information or the application program information, and to improve the security of the program sub-information and the application program information, the application program information may be randomly dispersed to obtain multiple pieces of program sub-information.

Here, at least one of the following may be randomly determined: the number of segmentation pieces of program sub-information and the segmentation position(s), so that the application program information is randomly dispersed according to the at least one of the following: the determined number of segmentation pieces of program sub-information and the determined segmentation position(s).

Step 214: storing the program sub-information.

Here, for the manner of storing application program sub-information, reference may be made to the description in the foregoing, and the details will be omitted here to avoid redundancy.

In the embodiment of the present disclosure, for example, in order to store the multiple pieces of program sub-information in a scattered manner, avoid directly exposing the application program information in a storage space such as a memory and make it difficult for hackers and the like to obtain the program sub-information as a whole (especially that the storage rule is difficult to recognize) and the application program information, and to improve the security of the program sub-information and the application program information, the multiple pieces of program sub-information may be stored in a plurality of storage locations in an information management space.

The information management space may include a memory.

In the embodiment of the present disclosure, for example, in order to reduce the risk of accidentally deleting the stored program sub-information, the information management space may be an independent or dedicated storage space. For example, the information management space may include an independent partition.

In addition, when the application program information is an application program key, the information management space may include a storage space in a KM (Key Manager).

In the information management space, at least one of the pieces of program sub-information may be randomly assigned to a corresponding storage location, thereby storing the multiple pieces of program sub-information to the plurality of storage locations in the information management space, wherein each storage location may store at least one of the pieces of program sub-information.

In the embodiment of the present disclosure, for example, in order to reduce the possibility of hackers and the like acquiring how the program sub-information is stored, to further reduce the possibility of the program sub-information and the application program information being acquired, and to improve the security of the program sub-information and the application program information, the program sub-information may be stored by using an information storage algorithm, and the information storage algorithm has undergone algorithm obfuscation processing.

Here, before the program sub-information is stored by using the information storage algorithm, the information storage algorithm may undergo algorithm obfuscation processing in the same manner as the algorithm obfuscation processing of the information segmentation algorithm in the foregoing, the details thereof will be omitted here to avoid redundancy.

In the embodiment of the present disclosure, firstly, an information segmentation algorithm having undergone algorithm obfuscation processing may be used to segment the application program information, the program sub-information obtained from the segmentation is stored. On the one hand, direct exposure of the application program information in a storage space such as a memory is avoided; on the other hand, the information segmentation algorithm having undergone algorithm obfuscation processing also makes it difficult for hackers and the like to acquire and determine how the application program information is segmented. In this way, even if the electronic device is obtained by a hacker, it would be difficult to obtain the application program information according to the program sub-information. Therefore, the possibility of the application program information being acquired by a hacker is greatly reduced, and the security of electronic devices is improved.

Secondly, multiple pieces of program sub-information may be stored in a plurality of storage locations in an information management space, that is, the multiple pieces of program sub-information are stored in a scattered manner, thereby avoiding directly exposing the application program information in a storage space such as a memory, and making it difficult for hackers and the like to acquire the program sub-information as a whole. In this way, obtaining the application program information becomes difficult, and the security of the program sub-information and the application program information is improved.

In addition, an auxiliary key such as the first auxiliary key and the second auxiliary key may be generated, and the application program information may be generated according to the auxiliary key(s) and raw application program information, that is, the complexity of acquiring the raw application program information may be increased through hierarchical key management, thereby improving the security of the raw application program information.

In addition, the application program information may include attribute information of the raw application program information, and check information of the raw application program information and/or the application program information, so that integrity verification may be performed on the application program information or the raw application program information when the application program information or the raw application program information is obtained subsequently according to the program sub-information, thereby improving the reliability of the application program information or the raw application program information.

Figure 3:
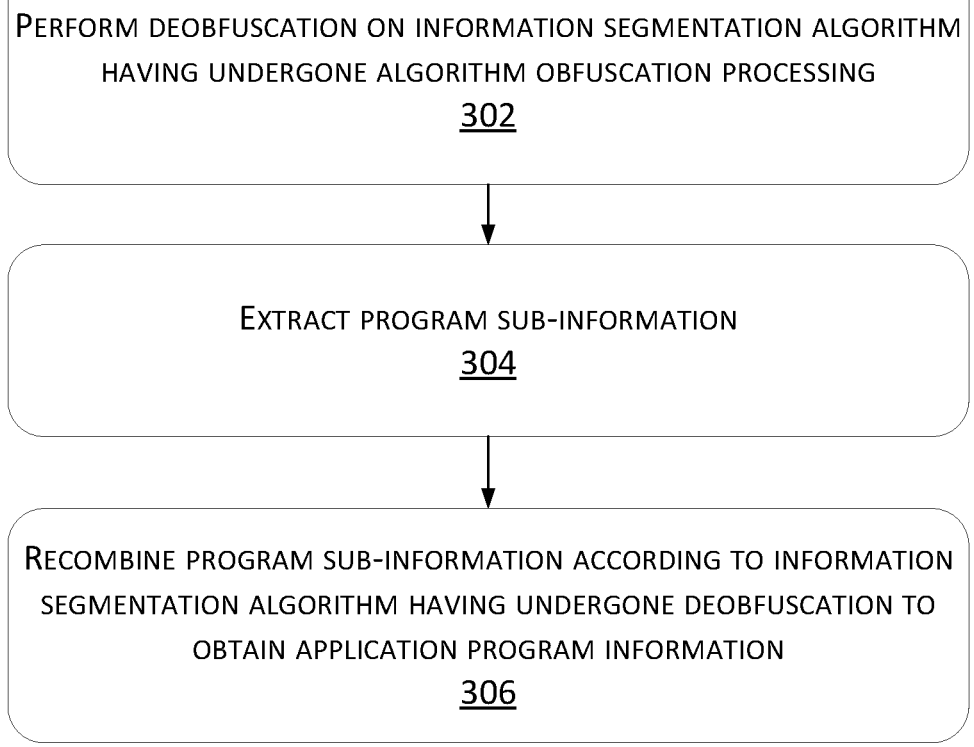
FIG. 3 shows a flowchart of a method for processing application program information according to an embodiment of the present disclosure.

Referring to FIG. 3, a flowchart of a method for processing application program information according to an embodiment of the present disclosure is shown. The method specifically comprises steps as follows:

step 302, performing deobfuscation on an information segmentation algorithm having undergone algorithm obfuscation processing.

In order to determine the manner of segmenting application program information, and then to acquire the application program information, deobfuscation may be performed on the information segmentation algorithm having undergone algorithm obfuscation processing.

The corresponding manner of deobfuscation processing may be determined according to the above-described manner of algorithm obfuscation processing, and then deobfuscation is performed on the information segmentation algorithm in the determined manner of deobfuscation processing.

For example, if the manner of algorithm obfuscation processing includes modifying names of various elements in a code, such as names of variables, functions, and classes, to meaningless names, during algorithm obfuscation processing on the information segmentation algorithm, the correct names and the replaced meaningless names of the various elements may be stored as a correspondence relationship between the correct names and the meaningless names, so that when the code having undergone the algorithm obfuscation processing is being deobfuscated, the meaningless names in the code may be replaced with the corresponding correct names according to the correspondence relationship between the correct names and the meaningless names, thereby obtaining the information segmentation algorithm before the algorithm obfuscation processing.

In addition, in another example embodiment of the present disclosure, if the algorithm obfuscation processing is an action that may convert a code of a computer program into a form that is functionally equivalent and difficult to read and understand, that is, the information segmentation algorithm having undergone algorithm obfuscation processing is difficult to read or understand but may still operate normally, then instead of performing deobfuscation on the information segmentation algorithm having undergone the algorithm obfuscation processing, the following step 304 may be directly performed.

Step 304: extracting program sub-information.

Since program sub-information is obtained by segmenting the application program information, the program sub-information may be extracted to obtain the application program information.

The program sub-information may be extracted according to the storage locations of the program sub-information.

Here, the storage locations of the program sub-information may be obtained when the program sub-information is being stored as described in the foregoing.

Step 306: recombining the program sub-information according to the information segmentation algorithm having undergone deobfuscation to obtain application program information.

Since the information segmentation algorithm may express the manner of segmenting application program information, the extracted program sub-information may be recombined according to the information segmentation algorithm having undergone deobfuscation to recover the application program information, that is, the application program information is obtained by recombining the program sub-information according to the information segmentation algorithm having undergone deobfuscation, so that there is no need to directly expose the application program information in a memory of an electronic device. Even if a hacker or the like acquires the electronic device, it would be difficult to acquire the application program information directly from the memory, and even if the program sub-information is acquired, it is difficult to determine the manner of segmenting the application program information since the information segmentation algorithm has undergone the algorithm obfuscation, and apparently it is difficult to obtain the application program information according to the program sub-information. In this way, the possibility that the application program information being acquired by a hacker is greatly reduced, and the security of the electronic device is improved.

The extracted program sub-information may be joined and restored according to the obtained segmentation sequence of the multiple pieces of program sub-information and/or the segmentation position where the application program information is segmented, thereby obtaining the application program information through recombination.

In the embodiment of the present disclosure, deobfuscation may be performed on the information segmentation algorithm to extract the program sub-information, and the program sub-information may be recombined according to the deobfuscated information segmentation algorithm to obtain the application program information. On the one hand, it avoids directly exposing the application program information in a storage space such as a memory; on the other hand, since the information segmentation algorithm has undergone algorithm obfuscation processing, it is difficult for a hacker to acquire and determine the manner of segmenting the application program information. In this way, even if the electronic device is obtained by a hacker or the like, it would be difficult to obtain the application program information according to the program sub-information, thereby greatly reducing the possibility of the application program information being acquired by hackers and the like, and improving the security of the electronic device.

Figure 4:
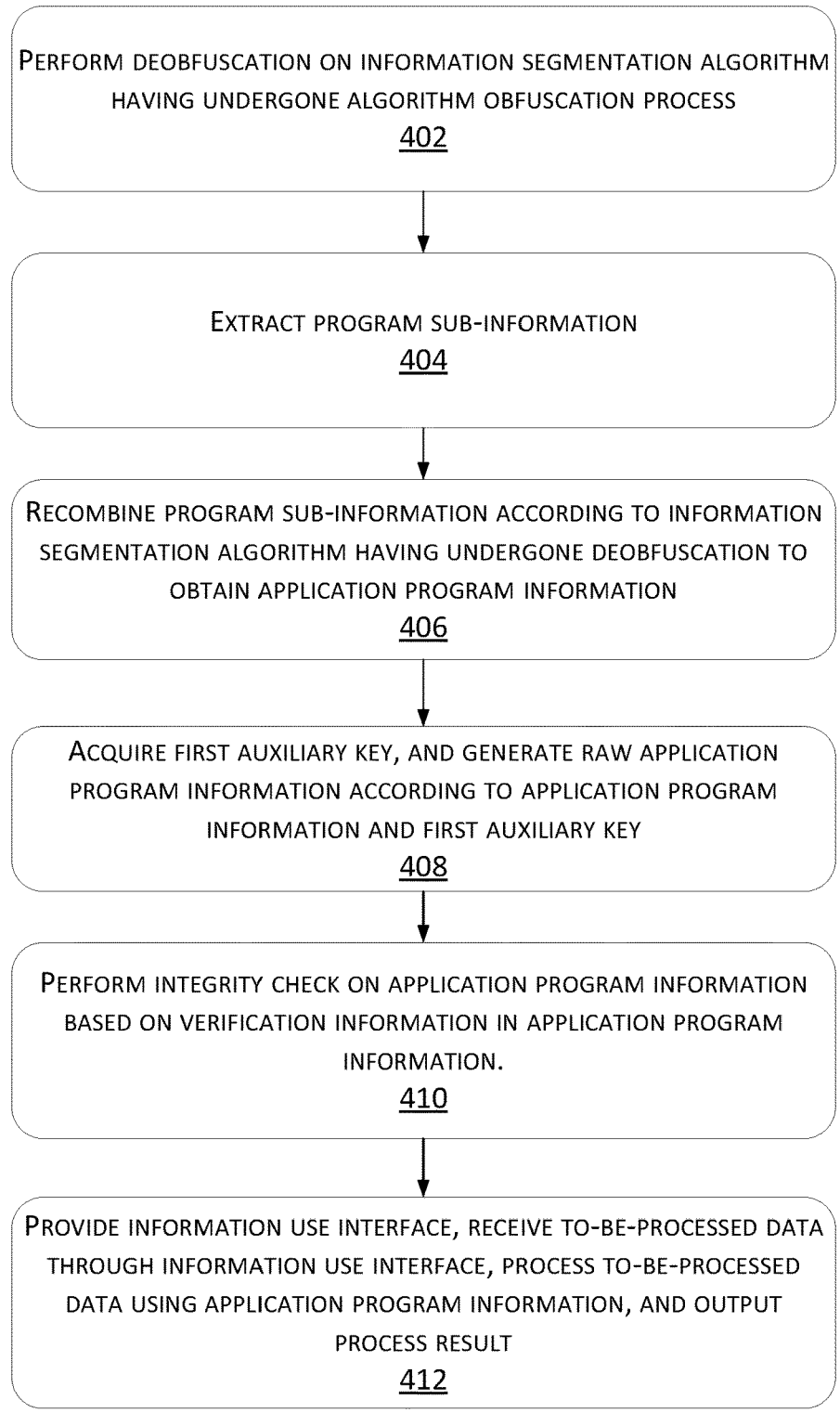
FIG. 4 shows a flowchart of a method for processing application program information according to an embodiment of the present disclosure.

Referring to FIG. 4, a flowchart of a method for processing application program information according to an embodiment of the present disclosure is shown. The method specifically comprises steps as follows:

step 402, performing deobfuscation on an information segmentation algorithm having undergone algorithm obfuscation processing.

Here, for the manner of performing deobfuscation on an information segmentation algorithm having undergone algorithm obfuscation processing, reference may be made to the related description in the foregoing, and the details will be omitted here to avoid redundancy.

In the embodiment of the present disclosure, for example, in order to improve the accuracy of the deobfuscated information segmentation algorithm, and in turn improve the reliability of the program information acquired subsequently, the information segmentation algorithm may undergo corresponding deobfuscation processing according to the algorithm obfuscation processing.

Here, the corresponding deobfuscation processing may be performed according to at least one of the following manners of algorithm obfuscation processing: function renaming, character string encryption, instruction substitution, control flow flattening, fake branch transformation, garbage insertion, and order disruption.

Step 404: extracting program sub-information.

Here, for the manner of extracting program sub-information, reference may be made to the related description in the foregoing, and the details will be omitted here to avoid redundancy.

In the embodiment of the present disclosure, for example, as may be seen from the foregoing, in order to reduce the possibility of hackers and the like acquiring the manner of storing the program sub-information, to in turn further reduce the possibility of the program sub-information and the application program information being acquired, and to improve the security of the program sub-information and the application program information, the program sub-information may be stored by using an algorithm storage algorithm having undergone algorithm obfuscation processing. Therefore, in order to ensure that all of the program sub-information corresponding to the application program information is acquired, and to improve the accuracy and reliability of the acquired program sub-information or application program information, the program sub-information may be extracted according to the information storage algorithm having undergone deobfuscation.

Here, before the program sub-information is extracted, the information storage algorithm may undergo deobfuscation processing in the same manner as the deobfuscation processing of the information segmentation algorithm, the details thereof will be omitted here to avoid redundancy.

Step 406: recombining the program sub-information according to the information segmentation algorithm having undergone deobfuscation to obtain application program information.

Here, for the manner of recombining the program sub-information according to the information segmentation algorithm having undergone deobfuscation, reference may be made to the related description in the foregoing, and the details will be omitted here to avoid redundancy.

Step 408: acquiring a first auxiliary key, and generating raw application program information according to the application program information and the first auxiliary key.

It may be seen from the foregoing that the application program information may be generated according to the raw application program information and the first auxiliary key. Therefore, in order to improve the reliability of acquiring the raw application program information, the first auxiliary key may be acquired, and the raw application program information may be generated according to the application program information and the first auxiliary key.

Here, the storage location of the first auxiliary key may be stored according to the storage process of the application program information, such as in the application program information or at another storage location in the electronic device, thereby enabling acquisition of the first auxiliary key.

In the embodiment of the present disclosure, for example, as may be seen from the foregoing, in order to achieve hierarchical key management, to further increase the difficulty for hackers and the like to crack and obtain the application program information, and to improve the security of the application program information and the electronic device, the first auxiliary key may be encrypted by a second auxiliary key. Therefore, in order to acquire the decrypted first auxiliary key, and to in turn improve the reliability of acquiring the raw application program information, the second auxiliary key may be generated and used to decrypt the encryption result of the first auxiliary key to obtain the first auxiliary key.

Here, the encryption result, namely the encrypted first auxiliary key, may be decrypted based on the means of encrypting the first auxiliary key with the second auxiliary key as described in the foregoing, thereby obtaining the first auxiliary key.

In the embodiment of the present disclosure, for example, in order to ensure that one electronic device corresponds to one second auxiliary key, to avoid the problem of cracking one electronic device leading to acquisition of application program information in other electronic devices of the same type, and to further improve the security of application programs and electronic devices, the second auxiliary key may be generated according to a unique device identifier.

In the embodiment of the present disclosure, for example, in order to achieve hierarchical key management, to further increase the difficulty for hackers and the like to crack and obtain the application program information, and to improve the security of the application program information and the electronic device, the application program information is obtained by encrypting the application program information with the first auxiliary key. Therefore, in order to improve the reliability of acquiring the raw application program information, the first auxiliary key may be used to decrypt the application program information and obtain the raw application program information.

Apparently, in practical applications, the application program information may also be generated in other manners according to the raw application program information and the first auxiliary key, for example, directly deleting the first auxiliary key of the application program information to obtain the raw application program information.

In addition, since the storage process of the application program information may choose not to involve hierarchical key management, execution of step 408 may be omitted after step 406 of recombining the program sub-information to obtain the application program information is performed, that is, step 408 is an example step.

Step 410: performing an integrity check on the application program information based on verification information in the application program information.

In order to ensure that the obtained application program information is the stored application program information as described in the foregoing, an integrity check may be performed on the application program information.

Here, check information of the application program information and/or attribute information of the application program information may be used to perform the integrity check on the application program information.

For example, if the integrity check is performed on the application program information by using the check information of the application program information, and the check information is a hash value of the application program information, the hash value of the application program information may be re-calculated, and the re-calculated hash value is compared against a hash value in the application program information. If they match, the integrity check is determined as a pass, and otherwise the integrity check is determined as a failure. If the integrity check is performed on the application program information by using the attribute information of the application program information, whether attributes of the application program attribute information are consistent with the attribute information may be determined, and if they are consistent, the integrity check is determined as a pass, and otherwise the integrity check is determined as a failure.

In the embodiment of the present disclosure, for example, as may be seen from the foregoing, the application program information may include check information for an integrity check and/or attribute information of the raw application program information, and the check information is generated according to at least one of the following: the raw application program information and/or the application program information. Therefore, the integrity check may be performed on the application program information according to the check information or the attribute information, and a result of the integrity check may be determined as a pass.

Here, if hierarchical key management is adopted for the storage process of the application program information in the foregoing, and step 408 is performed, the check information may include check information of the raw application program information and/or check information of the application program information; and apparently, if the foregoing storage process of the application program information does not employ hierarchical key management and step 408 is not performed, the check information is the check information of the application program information.

Step 412: providing an information use interface, receiving to-be-processed data through the information use interface, processing the to-be-processed data using the application program information, and outputting a processing result.

In order to further avoid the problem of exposing the application program information in a memory, to reduce the possibility of hackers and the like acquiring the application program information through static analysis or dynamic analysis, and to further improve the security of the application program information and the electronic device, an information use interface may be provided to receive to-be-processed data and output a processing result, that is, the entire life cycle of the application program information, including generation, storage and use, is limited to the information use interface, effectively reducing the possibility of hackers and the like acquiring the application program information.

For example, if the application program information is an application program key, the information use interface may include a key use interface, and the entire life cycle of the application program key is limited to a key management (KM) module, thereby preventing the application program key from appearing outside of the KM module. In addition, since the code that segments or stores the application program key in the KM module has undergone code obfuscation, it is difficult for hackers and the like to acquire the application program key through dynamic analysis or static analysis, thereby improving the security of the application program key and the electronic device.

In the embodiment of the present disclosure, firstly, deobfuscation may be performed on the information segmentation algorithm to extract the program sub-information, and the program sub-information may be recombined according to the deobfuscated information segmentation algorithm to obtain the application program information. On the one hand, it avoids directly exposing the application program information in a storage space such as a memory; on the other hand, since the information segmentation algorithm has undergone algorithm obfuscation processing, it is difficult for a hacker to acquire and determine the manner of segmenting the application program information. In this way, even if the electronic device is obtained by a hacker or the like, it is difficult to obtain the application program information according to the program sub-information, thereby greatly reducing the possibility of the application program information being acquired by hackers and the like, and improving the security of the electronic device.

Secondly, an auxiliary key such as the first auxiliary key and the second auxiliary key may be acquired, and the raw application program information may be generated according to the auxiliary key and the application program information, that is, the complexity in acquiring the raw application program information is increased through hierarchical key management, thereby improving the security of the raw application program information.

In addition, the application program information may include attribute information of the raw application program information, and check information of the raw application program information and/or the application program information, so that integrity verification may be performed on the application program information or the raw application program information when the application program information or the raw application program information is obtained subsequently according to the program sub-information, thereby improving the reliability of the application program information or the raw application program information.

In addition, an information use interface may be provided to receive to-be-processed data and output a processing result, that is, it is ensured that the entire life cycle of the application program information, including generation, storage and use, is limited to the information use interface, thereby further avoiding the problem of exposing the application program information in a memory, reducing the possibility of hackers and the like acquiring the application program information through static analysis or dynamic analysis, and further improving the security of the application program information and the electronic device accordingly.

Those skilled in the art could understand that not all of the method steps in the above-described embodiments are indispensable. Under specific circumstances, one or a plurality of steps may be omitted, as long as the technical purpose of storing the application program information is achieved. The present invention does not limit the number and order of steps in the embodiments, and the protection scope of the present invention should be defined by the limitations of the claims.

In order to enable those skilled in the art to better understand the present disclosure, the following takes application program information being an application program key for example to describe methods for storing and processing application program information according to an embodiment of the present disclosure. The methods specifically comprise steps as follows.

Figure 5:
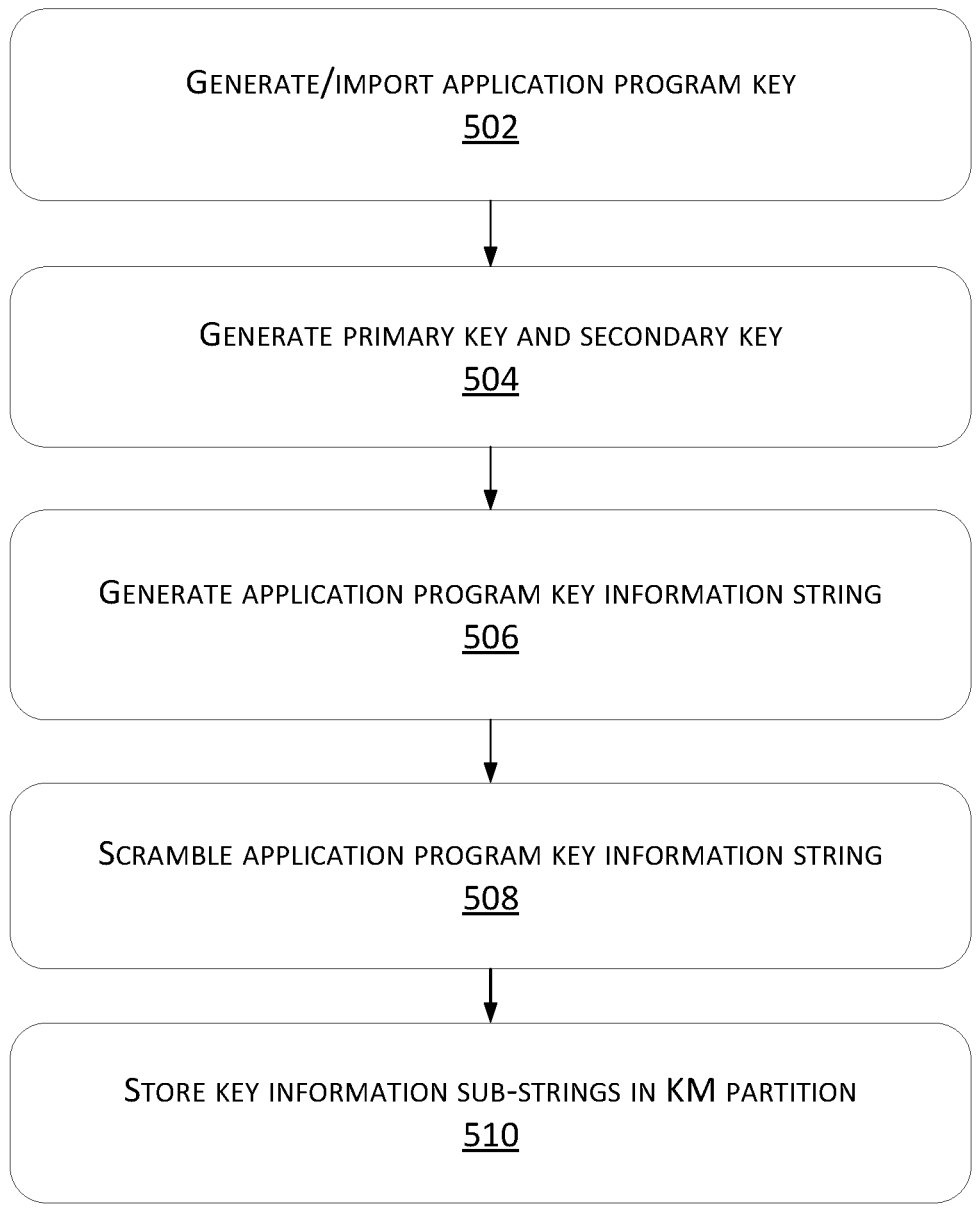
FIG. 5 shows a flowchart of a method for storing application program information according to an embodiment of the present disclosure.

Referring to FIG. 5, a flowchart of a method for storing application program information is provided. The method comprises:

step 502, generating/importing an application program key.

Through an application program, an electronic device may generate an application program key dedicated to the application program, or import and acquire an application program key dedicated to the application program from a server or another device corresponding to the application program.

Step 504: generating a primary key and a secondary key.

The primary key may be derived from a unique device identifier, which guarantees one key for one device (i.e., the electronic device), thereby solving the problem of cracking one electronic device leading to acquisition of keys of other electronic devices of the same type.

The secondary key may be randomly generated, which guarantees that the application program key of each application program will be encrypted by a different secondary key, thereby solving the problem of an acquired secondary key of one electronic device leading to acquisition of the secondary key of every copy of the application program.

The primary key, the secondary key and the application program key are generated in different manners, the secondary key is encrypted with the primary key, and then the application program key is encrypted with the encrypted secondary key, thereby achieving hierarchical key management, greatly increasing the complexity in acquiring the application program key, and effectively improving the security of the application program key.

Step 506: generating an application program key information string.

The application program key information string includes the encrypted application program key, encrypted and/or unencrypted check information of the application program key, and attribute information of the application program key, and may further include the secondary key encrypted by the primary key, which not only effectively enables detection of whether the application program key is tampered, but also increases the difficulty in cracking and obtaining the application program key.

Step 508: scrambling the application program key information string.

Scrambling the application program key information string may include randomly segmenting the application program key information string into a plurality of key information sub-strings, and performing code obfuscation on the segmentation algorithm. In the case that hackers do not know the segmentation means, even if the content of the storage space storing the application program key information string is acquired, it is still difficult to obtain the key information sub-strings, and thus difficult to acquire the application program key information string and the application program key.

Here, the code obfuscation may include at least one of the following: function renaming, character string encryption, instruction substitution, control flow flattening, fake branch transformation, garbage insertion and order disruption, which may make dissembling the obfuscated code difficult and increase the difficulty in cracking the source code through dynamic analysis or static analysis, effectively protecting the source code of the algorithm and the application program key.

Step 510: storing the key information sub-strings in a KM partition.

The key information sub-strings obtained by the segmentation may be scrambled and stored, such as randomly storing to a plurality of storage locations, and the storage algorithm may also undergo code obfuscation. In the case that hackers do not know the storage algorithm, it is difficult to acquire all the key information sub-strings, and thus difficult to acquire the application program key information string and the application program key.

Here, the application program key information string may be stored in an independent partition, which may reduce the risk of deleting the application program key string by mistake.

Figure 6:
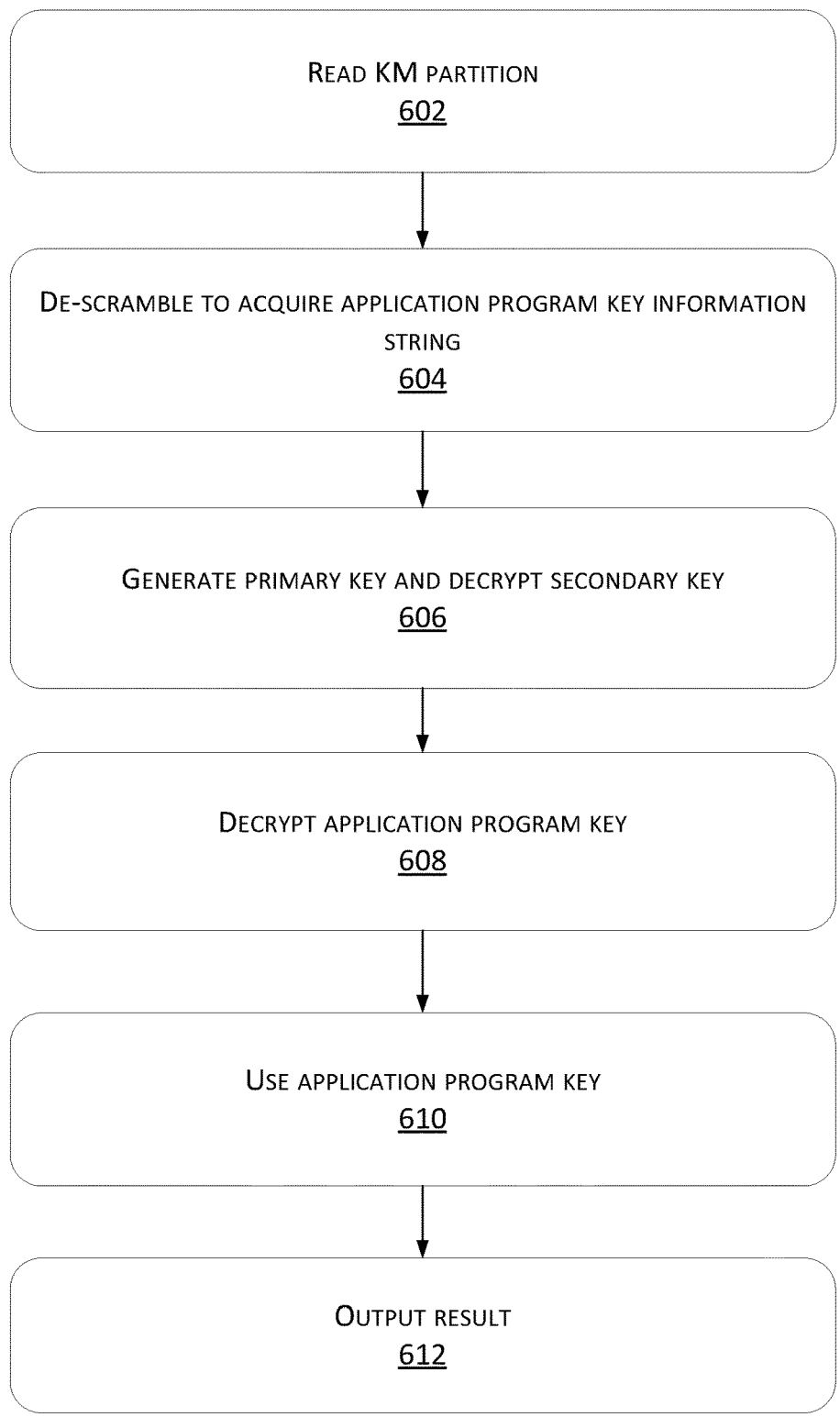
FIG. 6 shows a flowchart of a method for processing application program information according to an embodiment of the present disclosure.

Referring to FIG. 6, a flowchart of a method for processing application program information is provided. The method comprises:

step 602, reading a KM partition.

A plurality of stored key information sub-strings are acquired from a KM partition.

Step 604: de-scrambling to acquire an application program key information string.

Algorithms for storing and segmenting the application program key information string may undergo deobfuscation to determine a segmentation manner of the plurality of key information sub-strings, and recombine the plurality of key information sub-strings according to the segmentation manner, so as to obtain the application program key information string.

Step 606: generating a primary key and decrypting a secondary key.

The primary key may be generated in the same manner as described in the foregoing, an encrypted secondary key may be acquired from the application program key information string or another storage location, and then the secondary key may be decrypted with the primary key.

Step 608: decrypting an application program key.

The secondary key obtained by decryption may be used to decrypt an encrypted application program key.

Apparently, check information or attribute information included in the application program key information string may also be acquired to perform an integrity check on the encrypted application program key, so as to ensure the reliability of the acquired application program key.

Step 610: using the application program key.

Step 612: outputting a result.

Here, the KM may provide an external key use interface to ensure that the application program key will not be exposed outside the KM as plaintext during the entire use process, which effectively reduces the risk of the application program key being intercepted from a memory as plaintext.

Figure 7:
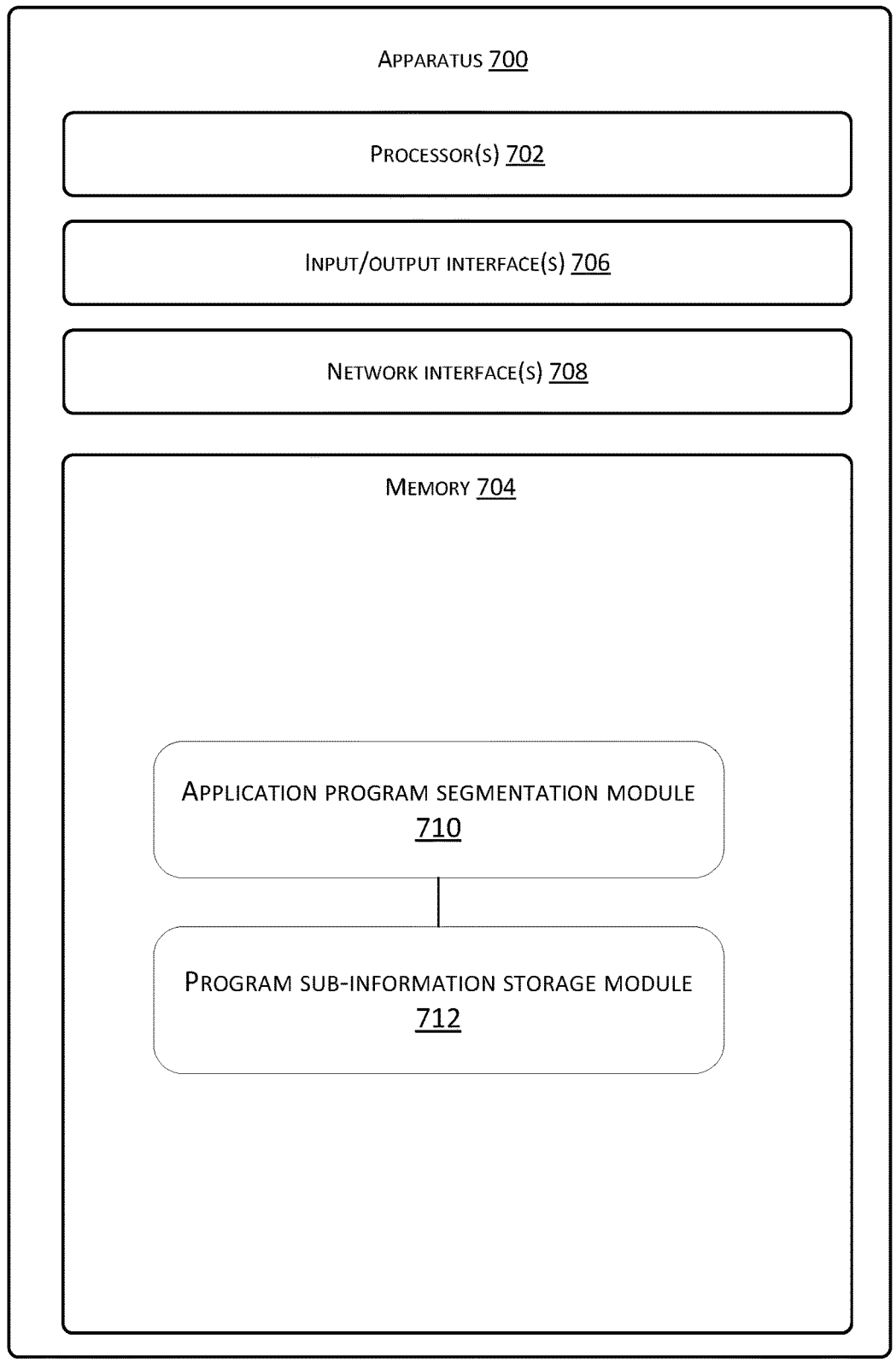
FIG. 7 shows a structural block diagram of an apparatus for storing application program information according to an embodiment of the present disclosure.

Referring to FIG. 7, a structural block diagram of an apparatus 700 for storing application program information according to an embodiment of the present disclosure is shown.

As shown in FIG. 7, the apparatus 700 includes one or more processor(s) 702 or data processing unit(s) and memory 704. The apparatus 700 may further include one or more input/output interface(s) 706 and one or more network interface(s) 708. The memory 704 is an example of computer readable media.

The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The memory 704 may store therein a plurality of modules or units including:

an application program segmentation module 710, configured to segment application program information into program sub-information, with an information segmentation algorithm of the application program information having undergone algorithm obfuscation processing; and a program sub-information storage module 712, configured to store the program sub-information.

For example, the application program segmentation module 710 comprises:

an application program information processing sub-module, configured to randomly disperse the application program information to obtain multiple pieces of program sub-information.

For example, the program sub-information storage module 712 comprises:

a first program sub-information storage sub-module, configured to store the multiple pieces of program sub-information to a plurality of storage locations in an information management space.

For example, the program sub-information storage module 712 comprises:

a second program sub-information storage sub-module, configured to store the program sub-information through an information storage algorithm, wherein the information storage algorithm has undergone algorithm obfuscation processing.

For example, the apparatus 700 further comprises the following one or more modules (not shown in FIG. 7) stored in the memory 704:

an algorithm obfuscation processing module, configured to perform algorithm obfuscation processing on the information segmentation algorithm.

For example, the algorithm obfuscation processing comprises at least one of the following: function renaming, character string encryption, instruction substitution, control flow flattening, fake branch transformation, garbage insertion, and order disruption.

For example, the apparatus further comprises the following modules (not shown in FIG. 7) stored in the memory 704:

an application program information generation module, configured to generate the application program information according to raw application program information and a first auxiliary key.

For example, the application program information generation module comprises:

a raw application program information encryption sub-module, configured to encrypt the raw application program information by using the first auxiliary key, to obtain the application program information.

For example, the apparatus 700 further comprises the following one or more modules (not shown in FIG. 7) stored in the memory 704:

a first auxiliary key generation module, configured to randomly generate the first auxiliary key.

For example, the apparatus 700 further comprises the following modules (not shown in FIG. 7) stored in the memory 704:

a first auxiliary key encryption module, configured to generate a second auxiliary key according to a unique device identifier and encrypt the first auxiliary key by using the second auxiliary key.

For example, the apparatus 700 further comprises the following one or more modules (not shown in FIG. 7) stored in the memory 704:

a first auxiliary key saving module, configured to save an encryption result of encrypting the first auxiliary key by using the second auxiliary key.

For example, the apparatus 700 further comprises the following modules (not shown in FIG. 7) stored in the memory 704:

a check information generation module, configured to generate check information for an integrity check according to at least one of the following: the raw application program information and/or the application program information, and add the check information to the application program information, so as to determine integrity of the raw application program information and/or the application program information according to the check information.

For example, the apparatus 700 further comprises the following one or more modules (not shown in FIG. 7) stored in the memory 704:

an attribute information generation module, configured to add attribute information of the raw application program information to the application program information, so as to determine integrity of the raw application program information according to the attribute information.

For example, the application program information includes an application program key.

In the embodiments of the present disclosure, an information segmentation algorithm having undergone algorithm obfuscation processing may be used to segment application program information, and program sub-information obtained from the segmentation is stored. On the one hand, it avoids directly exposing the application program information in a storage space such as a memory; on the other hand, the information segmentation algorithm having undergone algorithm obfuscation processing also makes it difficult for hackers and the like to acquire and determine the manner of segmenting the application program information. In this way, even if the electronic device is obtained by a hacker, it would be difficult to obtain the application program information according to the program sub-information. Therefore, the possibility of hackers and the like acquiring the application program information is greatly reduced, and the security of electronic devices is improved.

Figure 8:
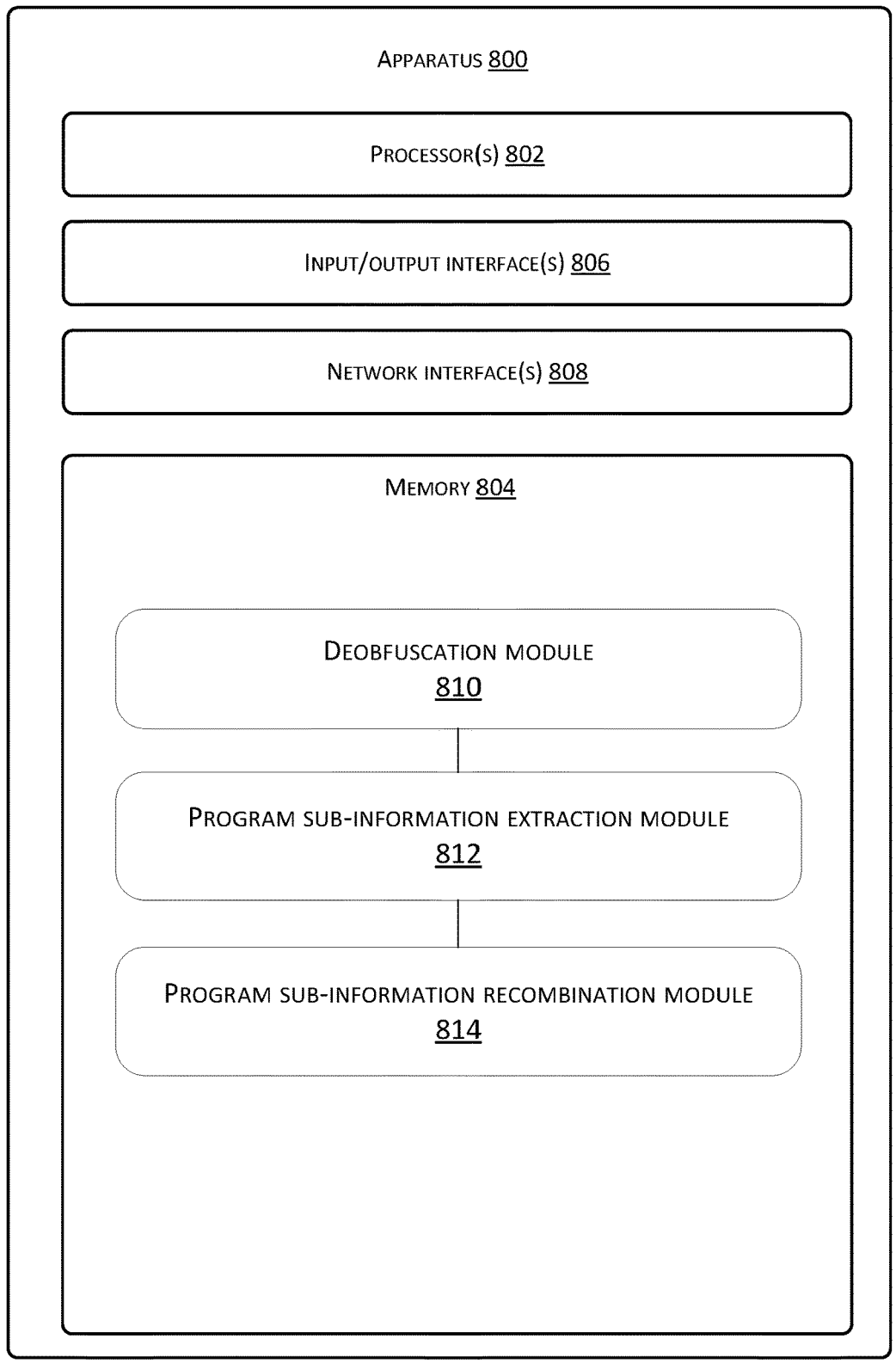
FIG. 8 shows a structural block diagram of an apparatus for processing application program information according to an embodiment of the present disclosure.

Referring to FIG. 8, a structural block diagram of an apparatus 800 for processing application program information according to an embodiment of the present disclosure is shown.

As shown in FIG. 8, the apparatus 800 includes one or more processor(s) 802 or data processing unit(s) and memory 804. The apparatus 800 may further include one or more input/output interface(s) 806 and one or more network interface(s) 808. The memory 804 is an example of computer readable media.

The memory 804 may store therein a plurality of modules or units including:

a deobfuscation module 810, configured to perform deobfuscation on an information segmentation algorithm having undergone algorithm obfuscation processing;

a program sub-information extraction module 812, configured to extract program sub-information; and a program sub-information recombination module 814, configured to recombine the program sub-information according to the information segmentation algorithm having undergone deobfuscation to obtain application program information.

For example, the deobfuscation module 810 comprises:

a deobfuscation processing sub-module, configured to perform corresponding deobfuscation processing on the information segmentation algorithm according to the algorithm obfuscation processing.

For example, the program sub-information extraction module 812 comprises:

a program sub-information extracting sub-module, configured to extract the program sub-information according to an information storage algorithm having undergone deobfuscation.

For example, the application program information is generated according to the raw application program information and a first auxiliary key, and the apparatus further comprises:

a first auxiliary key acquisition module, configured to acquire the first auxiliary key; and a raw application program information generation module, configured to generate the raw application program information according to the application program information and the first auxiliary key.

For example, the raw application program information generation module comprises:

an application program information decryption sub-module, configured to decrypt the application program information by using the first auxiliary key to obtain the raw application program information.

For example, the apparatus 800 further comprises the following one or more modules (not shown in FIG. 8) stored in the memory 804:

a second auxiliary key generation module, configured to generate a second auxiliary key; and a first auxiliary key decrypting module, configured to use the second auxiliary key to decrypt an encryption result of the first auxiliary key to obtain the first auxiliary key.

For example, the second auxiliary key generation module comprises:

a second auxiliary key generating sub-module, configured to generate the second auxiliary key according to a unique device identifier.

For example, the application program information includes check information for an integrity check and/or attribute information of the raw application program information, and the check information is generated according to at least one of the following: the raw application program information and/or the application program information; and the apparatus 800 further comprises the following one or more modules (not shown in FIG. 8) stored in the memory 804:

an integrity check module, configured to perform an integrity check on the application program information according to the check information or the attribute information, and determine that the integrity check passes.

For example, the apparatus 800 further comprises the following one or more modules (not shown in FIG. 8) stored in the memory 804:

an information use interface module, configured to provide an information use interface and receive to-be-processed data through the information use interface; and a processing result output module, configured to process the to-be-processed data using the application program information and output a processing result.

In the embodiment of the present disclosure, deobfuscation may be performed on the information segmentation algorithm to extract the program sub-information, and the program sub-information may be recombined according to the deobfuscated information segmentation algorithm to obtain the application program information. On the one hand, it avoids directly exposing the application program information in a storage space such as a memory; on the other hand, since the information segmentation algorithm has undergone algorithm obfuscation processing, it is difficult for a hacker to acquire and determine the manner of segmenting the application program information. In this way, even if the electronic device is obtained by a hacker or the like, it is difficult to obtain the application program information according to the program sub-information, thereby greatly reducing the possibility of the application program information being acquired by hackers and the like, and improving the security of the electronic device.

Since the apparatus embodiments are basically similar to the method embodiments, they are described in a more concise manner. For relevant content, reference may be made to the description of the method embodiments.

Figure 9:
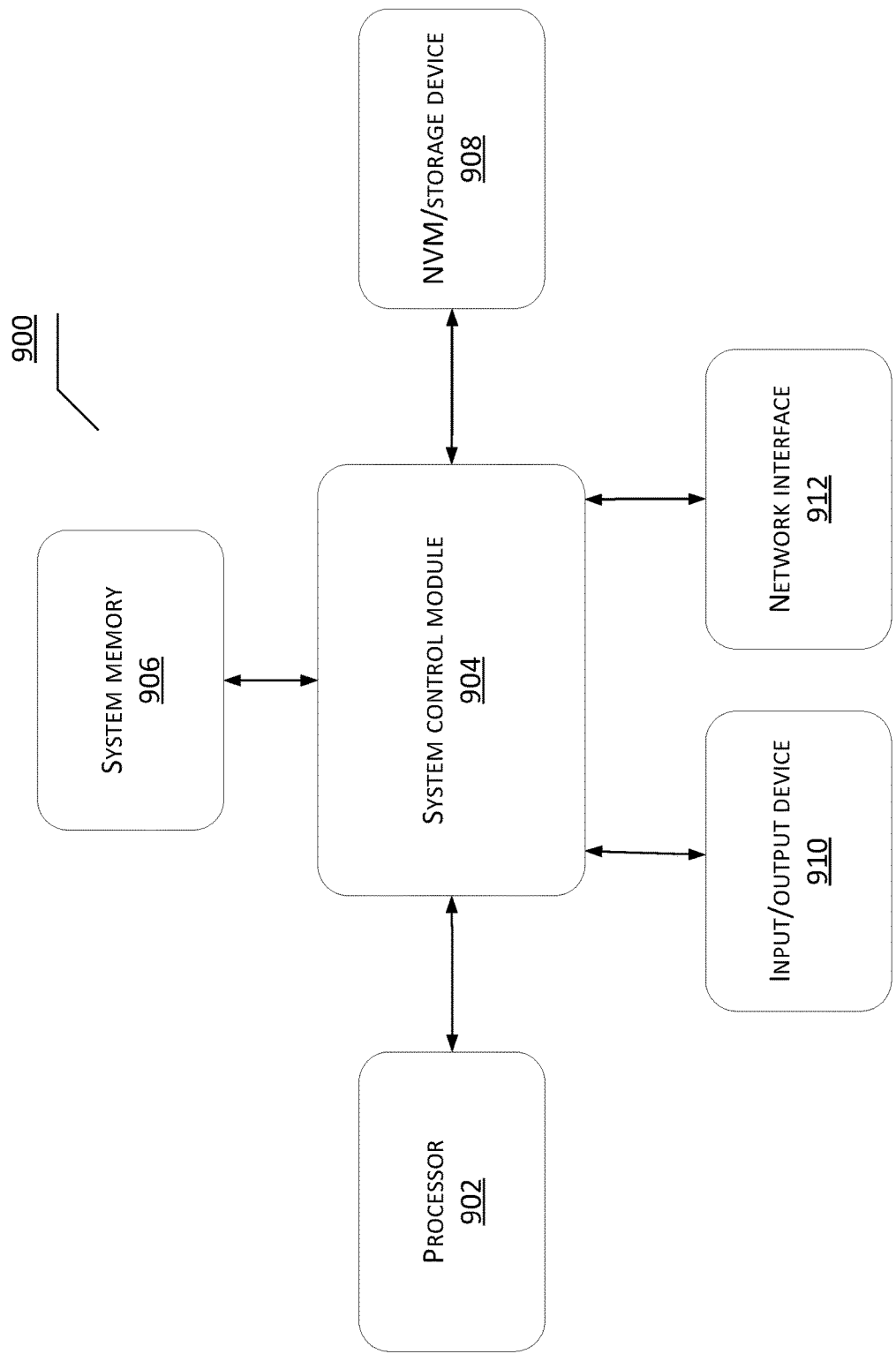
FIG. 9 shows a structural block diagram of an exemplary system according to an embodiment of the present disclosure.

The embodiments of the present disclosure may be implemented as a system that uses any appropriate hardware, firmware, software, or any combination thereof to form a desired configuration. FIG. 9 schematically shows an exemplary system (or apparatus) 900 that may be used to implement the embodiments described in the present disclosure.

In one embodiment, FIG. 9 shows an exemplary system 900 having one or a plurality of processor(s) 902, a system control module (chipset) 904 coupled to at least one of the (one or plurality of) processor(s) 902, a system memory 906 coupled to the system control module 904, a non-volatile memory (NVM)/storage device 908 coupled to the system control module 904, one or a plurality of input/output device 910 coupled to the system control module 904, and a network interface 912 coupled to the system control module 904.

The processor(s) 902 may comprise one or a plurality of single-core or multi-core processors, and may comprise any combination of general-purpose processors or special-purpose processors (e.g., graphics processors, application processors, baseband processors, etc.). In some embodiments, the system 900 may be used as the apparatus for storing or processing application program information described in the embodiments of the present disclosure.

In some embodiments, the system 900 may comprise one or a plurality of computer-readable media having instructions (e.g., the system memory 906 or the NVM/storage device 908) and one or a plurality of processor(s) 902 combined with the one or plurality of computer-readable media and configured to execute the instructions to form a module, so as to implement the actions described in the present disclosure.

In one embodiment, the system control module 904 may comprise any suitable interface controller to provide any suitable interface to at least one of the (one or plurality of) processor(s) 902 and/or any suitable device or component communicating with the system control module 904.

The system control module 904 may comprise a memory controller module to provide an interface to the system memory 906. The memory controller module may be a hardware module, a software module, and/or a firmware module.

The system memory 906 may be used to load and store data and/or instructions for the system 900, for example. In one embodiment, the system memory 906 may comprise any suitable volatile memory, for example, a suitable DRAM. In some embodiments, the system memory 906 may comprise a double-data-rate fourth-generation synchronous dynamic random-access memory (DDR4 SDRAM).

In one embodiment, the system control module 904 may comprise one or a plurality of input/output controllers to provide an interface to the NVM/storage device 908 and the (one or plurality of) input/output device(s) 910.

For example, the NVM/storage device 908 may be used to store data and/or instructions. The NVM/storage device 908 may comprise any suitable non-volatile memory (e.g., flash memory) and/or may comprise (one or more) arbitrary suitable non-volatile storage device(s) (e.g., one or more hard disk drives (HDD), one or more compact disc (CD) drives and/or one or more digital versatile disc (DVD) drives).

The NVM/storage device 908 may comprise storage resources as a physical part of the device on which the system 900 is installed, or it may be accessed by the device without having to be part of the device. For example, the NVM/storage device 908 may be accessed via the (one or plurality of) input/output device(s) 910 through a network.

The (one or plurality of) input/output device(s) 910 may provide an interface to the system 900, so as to communicate with any other suitable device. The input/output device 910 may comprise communication components, audio components, sensor components, and the like. The network interface 912 may provide an interface to the system 900 to communicate through one or a plurality of networks, and the system 900 may communicate with one or a plurality of components of a wireless network according to any standard and/or protocol of one or a plurality of wireless network standards and/or protocols, for example, by accessing a wireless network based on a communication standard, such as Wi-Fi, 2G or 3G, or a combination thereof for wireless communication.

In one embodiment, at least one of the (one or plurality of) processor(s) 902 may be packaged with a logic of one or a plurality of controllers (e.g., the memory controller module) of the system control module 904. In one embodiment, at least one of the (one or plurality of) processor(s) 902 may be packaged with a logic of one or a plurality of controllers of the system control module 904 to form a system-in-package (SiP). In one embodiment, at least one of the (one or plurality of) processor(s) 902 may be integrated with a logic of one or a plurality of controllers of the system control module 904 on the same mold. In one embodiment, at least one of the (one or plurality of) processor(s) 902 may be integrated with a logic of one or a plurality of controllers of the system control module 904 on the same mold to form a system-on-chip (SoC).

In various embodiments, the system 900 may be, but not limited to, a workstation, a desktop computing device, or a mobile computing device (e.g., a laptop computing device, a hand-held computing device, a tablet computer, a netbook, etc.). In various embodiments, the system 900 may have more or fewer components and/or a different architecture. For example, in some embodiments, the system 900 comprises one or a plurality of cameras, keyboards, liquid crystal display (LCD) screens (including touch screen displays), non-volatile memory ports, a plurality of antennas, a graphics chip, an application specific integrated circuit (ASIC) and a speaker.

Here, if the display includes a touch panel, the display screen may be implemented as a touch screen display to receive an input signal from a user. The touch panel includes one or a plurality of touch sensors to sense a touch, slide, and gesture on the touch panel. The touch sensor may sense the boundary of the touch or slide action, and further detect the duration and pressure related to the touch or slide action.

The embodiments of the present disclosure further provide a non-volatile readable storage medium having one or a plurality of modules (programs) stored thereon, and applying the one or plurality of modules on a terminal device enables the terminal device to execute instructions of each method step in the embodiments of the present disclosure.

In one example, an apparatus is provided, and comprises: one or a plurality of processors; and one or a plurality of machine-readable media having instructions stored thereon. When the instructions are executed by the one or plurality of processors, the apparatus is enabled to execute the method as executed by the apparatus for storing or processing application program information in the embodiments of the present disclosure.

In one example, one or a plurality of machine-readable media are further provided with instructions stored thereon. When executed by the one or a plurality of processors, the apparatus is enabled to execute the method as executed by the apparatus for storing or processing application program information in the embodiments of the present disclosure.

The embodiments of the present disclosure disclose methods and apparatuses for storing and processing application program information. Some of the examples are listed below.

Example 1: A method for storing application program information comprises:

segmenting the application program information into program sub-information, with an information segmentation algorithm of the application program information having undergone algorithm obfuscation processing; and storing the program sub-information.

Example 2 may include the method described in Example 1, and the step of segmenting the application program information into program sub-information comprises:

randomly dispersing the application program information to obtain multiple pieces of program sub-information.

Example 3 may include the method described in Example 1, and the step of storing the program sub-information comprises:

storing multiple pieces of program sub-information to a plurality of storage locations in an information management space.

Example 4 may include the method described in Example 1, and the step of storing the program sub-information comprises:

storing the program sub-information using an information storage algorithm, wherein the information storage algorithm has undergone algorithm obfuscation processing.

Example 5 may include the method described in Example 1, and the method further comprises:

performing algorithm obfuscation processing on the information segmentation algorithm.

Example 6 may include the method described in Example 4 or 5, and the algorithm obfuscation processing includes at least one of the following: function renaming, character string encryption, instruction substitution, control flow flattening, fake branch transformation, garbage insertion, and order disruption.

Example 7 may include the method described in Example 1, and the method further comprises:

generating the application program information according to raw application program information and a first auxiliary key.

Example 8 may include the method described in Example 7, and the step of generating the application program information according to raw application program information and a first auxiliary key comprises:

encrypting the raw application program information by using the first auxiliary key, to obtain the application program information.

Example 9 may include the method described in Example 7, and the method further comprises:

randomly generating the first auxiliary key.

Example 10 may include the method described in Example 7, and the method further comprises:

generating a second auxiliary key according to a unique device identifier, and encrypting the first auxiliary key by using the second auxiliary key.

Example 11 may include the method described in Example 10, and the method further comprises the following after the step of encrypting the first auxiliary key by using the second auxiliary key:

saving an encryption result of encrypting the first auxiliary key by using the second auxiliary key.

Example 12 may include the method described in Example 7, and the method further comprises:

generating check information for an integrity check according to at least one of the following: the raw application program information and/or the application program information, and adding the check information to the application program information, so as to determine integrity of the raw application program information and/or the application program information according to the check information.

Example 13 may include the method described in Example 7, and the method further comprises:

adding attribute information of the raw application program information to the application program information, so as to determine integrity of the raw application program information according to the attribute information.

Example 14 may include the method described in Example 1, and the application program information includes an application program key.

Example 15: A method for processing application program information comprises:

performing deobfuscation on an information segmentation algorithm having undergone algorithm obfuscation processing;

extracting program sub-information; and recombining the program sub-information according to the information segmentation algorithm having undergone deobfuscation to obtain application program information.

Example 16 may include the method described in Example 15, and the step of performing deobfuscation on an information segmentation algorithm having undergone algorithm obfuscation processing comprises:

performing corresponding deobfuscation processing on the information segmentation algorithm according to the algorithm obfuscation processing.

Example 17 may include the method described in Example 15, and the step of extracting program sub-information comprises:

extracting the program sub-information according to a deobfuscated information storage algorithm.

Example 18 may include the method described in Example 15, the application program information is generated according to raw application program information and a first auxiliary key, and the method further comprises:

acquiring the first auxiliary key; and generating the raw application program information according to the application program information and the first auxiliary key.

Example 19 may include the method described in Example 18, and the step of generating the raw application program information according to the application program information and the first auxiliary key comprises:

using the first auxiliary key to decrypt the application program information to obtain the raw application program information.

Example 20 may include the method described in Example 18, and the method further comprises:

generating a second auxiliary key; and using the second auxiliary key to decrypt an encryption result of the first auxiliary key to obtain the first auxiliary key.

Example 21 may include the method described in Example 20, and the step of generating a second auxiliary key comprises:

generating the second auxiliary key according to a unique device identifier.

Example 22 may include the method described in Example 15, the application program information includes check information for an integrity check and/or attribute information of raw application program information, and the check information is generated according to at least one of the following: the raw application program information and/or the application program information; and the method further comprises:

performing an integrity check on the application program information according to the check information or the attribute information, and determining that the integrity check passes.

Example 23 may include the method described in Example 15, and the method further comprises:

providing an information use interface, and receiving to-be-processed data through the information use interface; and processing the to-be-processed data using the application program information, and outputting a processing result.

Example 24: An apparatus for storing application program information comprises:

an application program segmentation module, configured to segment application program information into program sub-information, with an information segmentation algorithm of the application program information having undergone algorithm obfuscation processing; and a program sub-information storage module, configured to store the program sub-information.

Example 25 may include the apparatus described in Example 24, and the application program segmentation module comprises:

an application program information processing sub-module, configured to randomly disperse the application program information to obtain multiple pieces of program sub-information.

Example 26 may include the apparatus described in Example 24, and the program sub-information storage module comprises:

a first program sub-information storage sub-module, configured to store multiple pieces of program sub-information to a plurality of storage locations in an information management space.

Example 27 may include the apparatus described in Example 24, and the apparatus further comprises:

an application program information generation module, configured to generate the application program information according to raw application program information and a first auxiliary key.

Example 28 may include the apparatus described in Example 27, and the apparatus further comprises:

a first auxiliary key encryption module, configured to generate a second auxiliary key according to a unique device identifier and encrypt the first auxiliary key by using the second auxiliary key.

Example 29: An apparatus for processing application program information comprises:

a deobfuscation module, configured to perform deobfuscation on an information segmentation algorithm having undergone algorithm obfuscation processing;

a program sub-information extraction module, configured to extract program sub-information; and a program sub-information recombination module, configured to recombine the program sub-information according to the information segmentation algorithm having undergone deobfuscation to obtain application program information.

Example 30 may include the apparatus described in Example 29, the application program information is generated according to raw application program information and a first auxiliary key, and the apparatus further comprises:

a first auxiliary key acquisition module, configured to acquire the first auxiliary key; and a raw application program information generation module, configured to generate the raw application program information according to the application program information and the first auxiliary key.

Example 31 may include the apparatus described in Example 30, and the apparatus further comprises:

a second auxiliary key generation module, configured to generate a second auxiliary key; and a first auxiliary key decrypting module, configured to use the second auxiliary key to decrypt an encryption result of the first auxiliary key to obtain the first auxiliary key.

Example 32 may include the apparatus described in Example 29, and the apparatus further comprises:

an information use interface module, configured to provide an information use interface and receive to-be-processed data through the information use interface; and a processing result output module, configured to process the to-be-processed data using the application program information and output a processing result.

Example 33: An apparatus comprises: one or a plurality of processors; and one or a plurality of machine-readable media having instructions stored thereon. When the instructions are executed by the one or plurality of processors, the apparatus is enabled to execute one or a plurality of methods as described in Examples 1-23.

Example 34: One or a plurality of machine-readable media have instructions stored thereon, and when the instructions are executed by one or a plurality of processors, an apparatus is enabled to execute one or a plurality of methods as described in Examples 1-23.

Although some embodiments are for illustrative and descriptive purposes, various alternatives and/or equivalent implementation schemes or calculations used to achieve the same purposes illustrated and described in the embodiments do not depart from the scope of implementation of the present disclosure. The present disclosure is intended to cover any modifications or changes of the embodiments discussed herein.

The present disclosure may further be understood with clauses as follows.

Clause 1. A method for storing application program information, comprising:

segmenting the application program information into program sub-information, with an information segmentation algorithm of the application program information having undergone algorithm obfuscation processing; and storing the program sub-information.

Clause 2. The method according to clause 1, wherein the step of segmenting the application program information into program sub-information comprises:

randomly dispersing the application program information to obtain multiple pieces of program sub-information.

Clause 3. The method according to clause 1, wherein the step of storing the program sub-information comprises:

storing multiple pieces of program sub-information to a plurality of storage locations in an information management space.

Clause 4. The method according to clause 1, wherein the step of storing the program sub-information comprises:

storing the program sub-information using an information storage algorithm, wherein the information storage algorithm has undergone algorithm obfuscation processing.

Clause 5. The method according to clause 1, further comprising:

performing algorithm obfuscation processing on the information segmentation algorithm.

Clause 6. The method according to clause 4 or 5, wherein the algorithm obfuscation processing includes at least one of the following: function renaming, character string encryption, instruction substitution, control flow flattening, fake branch transformation, garbage insertion, and order disruption.

Clause 7. The method according to clause 1, further comprising:

generating the application program information according to raw application program information and a first auxiliary key.

Clause 8. The method according to clause 7, wherein the step of generating the application program information according to raw application program information and a first auxiliary key comprises:

encrypting the raw application program information by using the first auxiliary key, to obtain the application program information.

Clause 9. The method according to clause 7, further comprising:

randomly generating the first auxiliary key.

Clause 10. The method according to clause 7, further comprising:

generating a second auxiliary key according to a unique device identifier, and encrypting the first auxiliary key by using the second auxiliary key.

Clause 11. The method according to clause 10, further comprising the following after the step of encrypting the first auxiliary key by using the second auxiliary key:

saving an encryption result of encrypting the first auxiliary key by using the second auxiliary key.

Clause 12. The method according to clause 7, further comprising:

generating check information for an integrity check according to at least one of the following: the raw application program information and/or the application program information, and adding the check information to the application program information, so as to determine integrity of the raw application program information and/or the application program information according to the check information.

Clause 13. The method according to clause 7, further comprising:

adding attribute information of the raw application program information to the application program information, so as to determine integrity of the raw application program information according to the attribute information.

Clause 14. The method according to clause 1, wherein the application program information includes an application program key.

Clause 15. A method for processing application program information, comprising:

performing deobfuscation on an information segmentation algorithm having undergone algorithm obfuscation processing;

extracting program sub-information; and recombining the program sub-information according to the information segmentation algorithm having undergone deobfuscation to obtain application program information.

Clause 16. The method according to clause 15, wherein the step of performing deobfuscation on an information segmentation algorithm having undergone algorithm obfuscation processing comprises:

performing corresponding deobfuscation processing on the information segmentation algorithm according to the algorithm obfuscation processing.

Clause 17. The method according to clause 15, wherein the step of extracting program sub-information comprises:

extracting the program sub-information according to a deobfuscated information storage algorithm.

Clause 18. The method according to clause 15, wherein the application program information is generated according to raw application program information and a first auxiliary key, and the method further comprises:

acquiring the first auxiliary key; and generating the raw application program information according to the application program information and the first auxiliary key.

Clause 19. The method according to clause 18, wherein the step of generating the raw application program information according to the application program information and the first auxiliary key comprises:

using the first auxiliary key to decrypt the application program information to obtain the raw application program information.

Clause 20. The method according to clause 18, further comprising:

generating a second auxiliary key; and using the second auxiliary key to decrypt an encryption result of the first auxiliary key to obtain the first auxiliary key.

Clause 21. The method according to clause 20, wherein the step of generating a second auxiliary key comprises:

generating the second auxiliary key according to a unique device identifier.

Clause 22. The method according to clause 15, wherein the application program information includes check information for an integrity check and/or attribute information of raw application program information, and the check information is generated according to at least one of the following: the raw application program information and/or the application program information; and the method further comprises:

performing an integrity check on the application program information according to the check information or the attribute information, and determining that the integrity check passes.

Clause 23. The method according to clause 15, further comprising:

providing an information use interface, and receiving to-be-processed data through the information use interface; and processing the to-be-processed data using the application program information, and outputting a processing result.

Clause 24. An apparatus for storing application program information, comprising:

an application program segmentation module, configured to segment application program information into program sub-information, with an information segmentation algorithm of the application program information having undergone algorithm obfuscation processing; and a program sub-information storage module, configured to store the program sub-information.

Clause 25. The apparatus according to clause 24, wherein the application segmentation module comprises:

an application program information processing sub-module, configured to randomly disperse the application program information to obtain multiple pieces of program sub-information.

Clause 26. The apparatus according to clause 24, wherein the program sub-information storage module comprises:

a first program sub-information storage sub-module, configured to store multiple pieces of program sub-information to a plurality of storage locations in an information management space.

Clause 27. The apparatus according to clause 24, further comprising:

an application program information generation module, configured to generate the application program information according to raw application program information and a first auxiliary key.

Clause 28. The apparatus according to clause 27, further comprising:

a first auxiliary key encryption module, configured to generate a second auxiliary key according to a unique device identifier and encrypt the first auxiliary key by using the second auxiliary key.

Clause 29. An apparatus for processing application program information, comprising:

a deobfuscation module, configured to perform deobfuscation on an information segmentation algorithm having undergone algorithm obfuscation processing;

a program sub-information extraction module, configured to extract program sub-information; and a program sub-information recombination module, configured to recombine the program sub-information according to the information segmentation algorithm having undergone deobfuscation to obtain application program information.

Clause 30. The apparatus according to clause 29, wherein the application program information is generated according to raw application program information and a first auxiliary key, and the apparatus further comprises:

a first auxiliary key acquisition module, configured to acquire the first auxiliary key; and a raw application program information generation module, configured to generate the raw application program information according to the application program information and the first auxiliary key.

Clause 31. The apparatus according to clause 30, further comprising:
a second auxiliary key generation module, configured to generate a second auxiliary key; and
a first auxiliary key decrypting module, configured to use the second auxiliary key to decrypt an encryption result of the first auxiliary key to obtain the first auxiliary key.

Clause 32. The apparatus according to clause 29, further comprising:
an information use interface module, configured to provide an information use interface and receive to-be-processed data through the information use interface; and
a processing result output module, configured to process the to-be-processed data using the application program information and output a processing result.

Clause 33. A computer device, comprising a memory, a processor, and a computer program stored on the memory and executable on the processor, wherein executing the computer program by the processor implements the method of any one of clauses 1 to 23.

Clause 34. A computer-readable storage medium having a computer program stored thereon, wherein executing the computer program by a processor implements the method of any one of clauses 1 to 23.

What is claimed is:

1. A method implemented by a computing device, the method comprising:
generating application program information, the generating comprising:
encrypting raw application program information using a first auxiliary key;
encrypting the first auxiliary key using a second auxiliary key; and
adding the encrypted first auxiliary key and attribute information of the raw application program information to the encrypted raw application program information to generate the application program information, the attribute information comprising a length and a type of the raw application program information;
determining a segmentation number and a plurality of segmentation positions for the application program information, wherein the determining is based on a pre-determined security level of the application program information;
generating an information segmentation algorithm, wherein the information segmentation algorithm comprises the segmentation number and the plurality of segmentation positions;
segmenting the application program information into multiple pieces of program sub-information based on the segmentation number and the plurality of segmentation positions of the information segmentation algorithm, the information segmentation algorithm having undergone algorithm obfuscation processing; and
storing the multiple pieces of program sub-information in a plurality of storage locations of the computing device.

2. The method according to claim 1, wherein segmenting the application program information into the multiple pieces of program sub-information further comprises:
randomly dispersing the application program information to obtain the multiple pieces of program sub-information.

3. The method according to claim 1, wherein storing the multiple pieces of program sub-information comprises:
storing the multiple pieces of program sub-information to the plurality of storage locations in an information management space of the computing device.

4. The method according to claim 1, wherein storing the multiple pieces of program sub-information comprises:
storing the multiple pieces of program sub-information using an information storage algorithm, wherein the information storage algorithm has undergone another algorithm obfuscation processing.

5. The method according to claim 1, further comprising:
performing the algorithm obfuscation processing on the information segmentation algorithm.

6. The method according to claim 5, wherein the algorithm obfuscation processing includes at least one of: function renaming, character string encryption, instruction substitution, control flow flattening, fake branch transformation, garbage insertion, or order disruption.

7. The method according to claim 1, further comprising:
randomly generating the first auxiliary key.

8. The method according to claim 1, further comprising:
generating the second auxiliary key according to a unique device identifier.

9. The method according to claim 1, further comprising:
generating check information for an integrity check according to at least one of: the raw application program information or the application program information; and
adding the check information to the encrypted raw application program information to determine integrity of the raw application program information or the application program information according to the check information.

10. The method according to claim 1, wherein the attribute information of the raw application program information is added to the application program information to determine integrity of the encrypted raw application program information according to the attribute information.

11. The method according to claim 1, wherein the application program information includes an application program key.

12. An apparatus comprising:
one or more processors; and
one or more memories storing thereon computer-readable instructions that, when executed by the one or more processors, cause the one or more processors to perform acts comprising:
obtaining an information segmentation algorithm, wherein the information segmentation algorithm comprises a segmentation number and a plurality of segmentation positions determined for application program information to be obtained based on a pre-determined security level of the application program information;
performing deobfuscation on the information segmentation algorithm having undergone algorithm obfuscation processing;
extracting multiple pieces of program sub-information from a plurality of storage locations of a computing device; and
recombining the multiple pieces of program sub-information based at least in part on the segmentation number and the plurality of segmentation positions of the information segmentation algorithm having undergone the deobfuscation to obtain application program information, wherein the application program information is generated by:
    encrypting raw application program information using a first auxiliary key;
    encrypting the first auxiliary key using a second auxiliary key; and
    adding the encrypted key auxiliary key and attribute information of the raw application program information to the encrypted raw application program information to generate the application program information, the attribute information comprising a length and a type of the raw application program information.

13. The apparatus according to claim 12, wherein performing the deobfuscation on the information segmentation algorithm having undergone the algorithm obfuscation processing comprises:
    performing corresponding deobfuscation processing on the information segmentation algorithm according to the algorithm obfuscation processing.

14. The apparatus according to claim 12, wherein extracting the multiple pieces of program sub-information comprises:
    extracting the multiple pieces of program sub-information according to a deobfuscated information storage algorithm.

15. One or more memories storing thereon computer-readable instructions that, when executed by one or more processors, cause the one or more processors to perform acts comprising:
    obtaining an information segmentation algorithm, wherein the information segmentation algorithm comprises a segmentation number and a plurality of segmentation positions determined for application program information to be obtained based on a predetermined security level of the application program information;

performing deobfuscation on the information segmentation algorithm having undergone algorithm obfuscation processing;

extracting multiple pieces of program sub-information from a plurality of storage locations of a computing device; and recombining the multiple pieces of program sub-information based at least in part on the segmentation number and the plurality of segmentation positions of the information segmentation algorithm having undergone the deobfuscation to obtain application program information, wherein the application program information is generated by:

encrypting raw application program information using a first auxiliary key;

encrypting the first auxiliary key using a second auxiliary key; and adding the encrypted key auxiliary key and attribute information of the raw application program information to the encrypted raw application program information to generate the application program information, the attribute information comprising a length and a type of the raw application program information.

* * * * *